US009955036B2

(12) United States Patent
Shiraishi

(10) Patent No.: US 9,955,036 B2
(45) Date of Patent: Apr. 24, 2018

(54) IMAGE FORMING APPARATUS INCLUDING A FIRST STORAGE, A SECOND STORAGE, AND A BUS AND IMAGE FORMING METHOD USING THE SAME

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/468,315

(22) Filed: Mar. 24, 2017

(65) Prior Publication Data
US 2017/0302817 A1    Oct. 19, 2017

(30) Foreign Application Priority Data

Apr. 19, 2016    (JP) .................. 2016-083905

(51) Int. Cl.
*H04N 1/32*    (2006.01)
*H04N 1/411*    (2006.01)
*H04N 1/21*    (2006.01)
*G06F 13/16*    (2006.01)
*G06F 13/40*    (2006.01)
*G06F 13/42*    (2006.01)

(52) U.S. Cl.
CPC ..... *H04N 1/32598* (2013.01); *G06F 13/1668* (2013.01); *G06F 13/4068* (2013.01); *G06F 13/42* (2013.01); *H04N 1/2104* (2013.01); *H04N 1/32593* (2013.01); *H04N 1/411* (2013.01); *H04N 2201/0094* (2013.01); *H04N 2201/216* (2013.01)

(58) Field of Classification Search
None
See application file for complete search history.

(56) References Cited

U.S. PATENT DOCUMENTS

| 5,337,168 A | 8/1994 | Fujii et al. |
| 5,341,468 A | 8/1994 | Shiraishi et al. |
| 5,396,585 A | 3/1995 | Fujii et al. |

(Continued)

FOREIGN PATENT DOCUMENTS

| JP | 2009-147820 | 7/2009 |
| JP | 2011-059979 | 3/2011 |

(Continued)

OTHER PUBLICATIONS

U.S. Appl. No. 07/727,832, filed Jul. 9, 1991.

(Continued)

*Primary Examiner* — Andrew H Lam
(74) *Attorney, Agent, or Firm* — IPUSA, PLLC

(57) ABSTRACT

An image forming apparatus, which includes a first storage, a second storage, and a bus, includes a first controller configured to store first image data based on input image data, in the first storage, when the input image data is input via the bus; a second controller configured to store second image data based on the first image data, in the second storage; a third controller configured to store third image data based on the second image data, in the first storage; a fourth controller configured to output output image data based on the third image data; and an image former configured to perform image formation based on the output image data.

15 Claims, 20 Drawing Sheets

(56) References Cited

U.S. PATENT DOCUMENTS

| | | |
|---|---|---|
| 5,448,690 A | 9/1995 | Shiraishi et al. |
| 5,455,900 A | 10/1995 | Shiraishi et al. |
| 5,459,822 A | 10/1995 | Izawa et al. |
| 5,465,371 A | 11/1995 | Fujii et al. |
| 5,502,802 A | 3/1996 | Shiraishi |
| 5,551,019 A | 8/1996 | Izawa et al. |
| 5,739,826 A | 4/1998 | Shiraishi et al. |
| 5,828,378 A | 10/1998 | Shiraishi |
| 5,859,650 A | 1/1999 | Shiraishi |
| 5,903,276 A | 5/1999 | Shiraishi |
| 7,454,528 B2 | 11/2008 | Kanoshima et al. |
| 7,456,985 B2 | 11/2008 | Shiraishi |
| 7,701,594 B2 | 4/2010 | Shiraishi |
| 7,962,658 B2 | 6/2011 | Kanoshima et al. |
| 8,503,025 B2 | 8/2013 | Shiraishi |
| 8,786,901 B2 | 7/2014 | Shiraishi |
| 9,172,839 B2 | 10/2015 | Fukushima |
| 2005/0246684 A1* | 11/2005 | Shiraishi ............... G06F 3/1215 717/115 |
| 2011/0231629 A1 | 9/2011 | Shiraishi |
| 2014/0362395 A1 | 12/2014 | Shiraishi |
| 2016/0127604 A1* | 5/2016 | Kawano ............... G06F 9/5044 358/1.15 |

FOREIGN PATENT DOCUMENTS

| | | |
|---|---|---|
| JP | 2015-035201 | 2/2015 |
| JP | 2015-158894 | 9/2015 |

OTHER PUBLICATIONS

U.S. Appl. No. 07/932,357, filed Aug. 19, 1992.
U.S. Appl. No. 07/827,635, filed Jan. 29, 1992.
U.S. Appl. No. 08/076,989, filed Jun. 15, 1993.
U.S. Appl. No. 08/597,344, filed Feb. 6, 1996.
U.S. Appl. No. 08/102,050, filed Aug. 4, 1993.
U.S. Appl. No. 08/317,116, filed Oct. 3, 1994.
U.S. Appl. No. 08/381,102, filed Jan. 31, 1995.

* cited by examiner

IMAGE FORMING APPARATUS INCLUDING A FIRST STORAGE, A SECOND STORAGE, AND A BUS AND IMAGE FORMING METHOD USING THE SAME

CROSS-REFERENCE TO RELATED APPLICATION

The present application claims priority under 35 U.S.C. § 119 to Japanese Patent Application No. 2016-083905, filed on Apr. 19, 2016, the contents of which are incorporated herein by reference in their entirety.

BACKGROUND OF THE INVENTION

1. Field of the Invention

The present invention relates to an image forming apparatus and an image forming method.

2. Description of the Related Art

Conventionally, there is known an image forming apparatus including a main memory coupled to an engine Application Specific Integrated Circuit (ASIC), an image memory coupled to a controller ASIC, and a virtual memory coupled to a processor System on Chip (SoC). In such a memory configuration, there is known a controller ASIC including a data transfer control unit configured to transfer image data from any memory to another memory, by direct memory access control.

For example, the following method is known. Specifically, the data transfer control unit first receives instruction control of SoC, and the data transfer control unit compares the priority levels that are set in advance with respect to data transfer operations to be performed in cooperation with the engine ASIC. Then, the data transfer control unit performs a data transfer arbitration process. The data transfer arbitration process includes determining whether the respective data transfer operations are to be performed and determines the order of performing the data transfer operations, based on the comparison result, and determining the optimum memory according to control based on the data flow. In this way, when data is transferred between memories coupled to devices, the transfer band of a data transfer having a high priority is not decreased, and data transfer operations can be efficiently performed constantly (see, for example, Patent Document 1).

Patent Document 1: Japanese Unexamined Patent Application Publication No. 2015-158894

SUMMARY OF THE INVENTION

An aspect of the present invention provides an image forming apparatus and an image forming method, in which one or more of the above-described disadvantages are reduced.

According to one aspect of the present invention, there is provided an image forming apparatus including a first storage, a second storage, and a bus, the image forming apparatus including a first controller configured to store first image data based on input image data, in the first storage, when the input image data is input via the bus; a second controller configured to store second image data based on the first image data, in the second storage; a third controller configured to store third image data based on the second image data, in the first storage; a fourth controller configured to output output image data based on the third image data; and an image former configured to perform image formation based on the output image data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In image forming operations of the related art, there are cases where multiple buses are used for sending and receiving image data, and the purposes of using the bus may compete with each other.

A problem to be solved by an embodiment of the present invention is to provide an image forming apparatus that is capable of reducing the competition for using a bus, in image forming operations.

Embodiments of the present invention will be described by referring to the accompanying drawings.

<Image Forming Apparatus>

Figure 1:
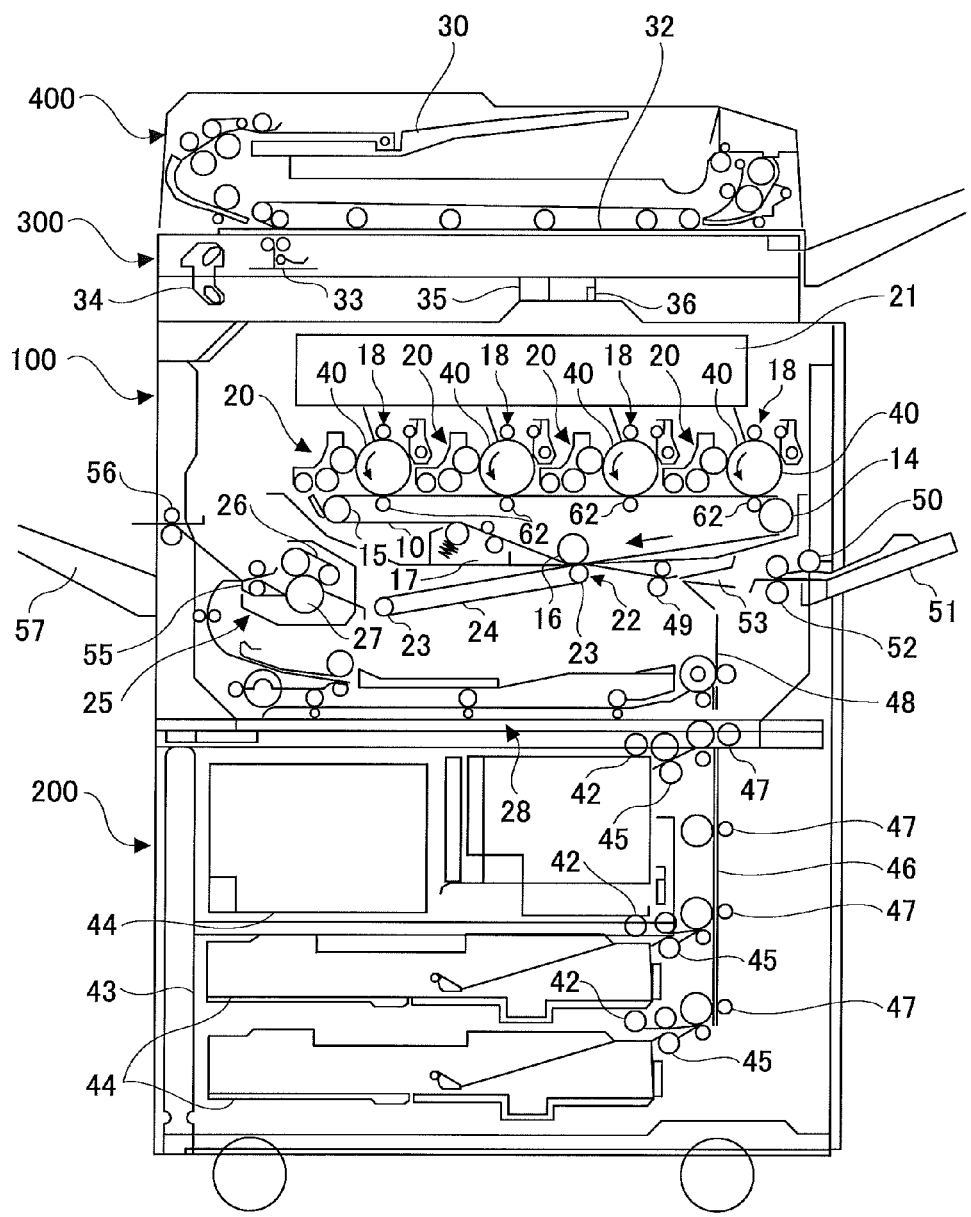
FIG. 1 illustrates an example of an overall configuration of an image forming apparatus according to an embodiment of the present invention.

FIG. 1 illustrates an example of an overall configuration of an image forming apparatus according to an embodiment of the present invention. For example, an image forming apparatus 100 is an apparatus having a configuration as illustrated in FIG. 1. In the following, a description is given of the image forming apparatus 100 having the configuration as illustrated in FIG. 1. Specifically, the image forming apparatus 100 illustrated in FIG. 1 is an image forming apparatus of an electrophotographic method having a secondary transfer mechanism referred to as a tandem system in color image forming.

The image forming apparatus 100 includes an intermediate transfer unit. Furthermore, the intermediate transfer unit includes an intermediate transfer belt 10 that is an endless belt. Furthermore, in FIG. 1, the intermediate transfer belt 10 is wound around three support rollers 14 through 16, and rotates in a clockwise direction.

An intermediate transfer body cleaning unit 17 removes toner remaining on the intermediate transfer belt 10, after an image formation process is performed.

An image formation device 20 includes a cleaning unit, a charging unit 18, a discharging unit, a developing unit, and a photoconductor unit 40.

In FIG. 1, the image forming apparatus 100 includes the image formation devices 20 corresponding to the respective colors of yellow (Y), magenta (M), cyan (C), and black (K) (in the following, colors may be expressed by the symbols in parenthesis). Furthermore, each of the image formation devices 20 is disposed between the first support roller 14 and the second support roller 15. Note that in the example of FIG. 1, the image formation devices 20 corresponding to the respective colors are disposed in the order of yellow (Y), magenta (M), cyan (C), and black (K) in the conveying direction of the intermediate transfer belt 10. Furthermore, the image formation devices 20 are detachably attached to the image forming apparatus 100.

A light beam scanning device 21 irradiates the photoconductive drum, which is included in each of the photoconductor units 40 of the respective colors, with light beams to form images.

A secondary transfer unit 22 includes two rollers 23 and a secondary transfer belt 24. Specifically, the secondary transfer belt 24 is an endless belt. Furthermore, the secondary transfer belt 24 is wound around the two rollers 23, and rotates. Furthermore, in FIG. 1, the rollers 23 and the secondary transfer belt 24 are disposed so as to push up the intermediate transfer belt 10 against the third support roller 16. Furthermore, the secondary transfer belt 24 transfers an image formed on the intermediate transfer belt 10 onto a recording medium. Note that the recording medium is, for example, paper or a plastic sheet, etc.

A fixing unit 25 performs a fixing process. Furthermore, the fixing unit 25 includes a fixing belt 26 and a pressurizing roller 27. Note that the fixing belt 26 is an endless belt. Furthermore, the fixing belt 26 and the pressurizing roller 27 are disposed such that the pressurizing roller 27 is pushed against the fixing belt 26. First, in the fixing process, a recording medium, on which a toner image has been transferred, is sent to the fixing unit 25. Next, the fixing unit 25 heats the recording medium. In this way, the fixing unit 25 fixes the image to the recording medium.

A sheet reversing unit 28 reverses the front side and the back side of a recording medium. Note that the sheet reversing unit 28 is used when forming an image on the front side and subsequently forming an image on the back side.

An automatic sheet feeding device (Auto Document Feeder (ADF)) 400 conveys a recording medium onto an exposure glass 32, when the user presses a start button when the recording medium is placed on a sheet feeding stand 30. On the other hand, when there is no recording medium on the sheet feeding stand 30, the automatic sheet feeding device 400 activates an image reading unit 300 to read a recording medium that is placed on the exposure glass 32 by a user.

The image reading unit 300 includes a first carriage 33, a second carriage 34, an imaging forming lens 35, a Charge Coupled Device (CCD) 36, and a light source.

The image reading unit 300 operates the first carriage 33 and the second carriage 34 to read a recording medium on the exposure glass 32.

The light source included in the first carriage 33 emits light toward the exposure glass 32. Next, the light, which is emitted from the light source in the first carriage 33, is reflected from the recording medium on the exposure glass 32. Furthermore, the reflected light is reflected by a first mirror in the first carriage 33, toward the second carriage 34. Next, the light reflected toward the second carriage 34 forms an image on the CCD 36, which is a reading sensor, through the imaging forming lens 35.

The image forming apparatus 100 generates image data items corresponding to the respective colors of Y, M, C, and K, etc., by the CCD 36.

When the user presses the start button or when a print request is received from an external device such as a personal computer (PC), etc., the image forming apparatus 100 rotates the intermediate transfer belt 10. Furthermore, when a fax output instruction is received, the image forming apparatus 100 rotates the intermediate transfer belt 10.

When the intermediate transfer belt 10 starts rotating, the image formation devices 20 start an image formation process. When a toner image is transferred onto a recording medium, the recording medium is sent to the fixing unit 25. Next, as the fixing unit 25 performs a fixing process, an image is formed on the recording medium.

A sheet feeding table 200 includes sheet feeding rollers 42, a sheet feeding unit 43, a separation roller 45, and a conveying roller unit 46. Furthermore, the sheet feeding unit 43 may include a plurality of sheet feeding trays 44. Furthermore, the conveying roller unit 46 includes a conveying roller 47.

The sheet feeding table 200 selects one of the sheet feeding rollers 42. Next, the sheet feeding table 200 rotates the selected sheet feeding roller 42.

The sheet feeding unit 43 selects one of the sheet feeding trays 44, and sends out recording media from the selected sheet feeding tray 44. Next, the sent out recording media are separated into single sheets by the separation roller 45, and each sheet is put into the conveying roller unit 46. Furthermore, the conveying roller unit 46 sends the recording medium to the image forming apparatus 100 by the conveying roller 47.

Next, the recording medium is sent to a registration roller 49 by the conveying roller unit 46. Next, the recording medium that is sent to the registration roller 49 is retained in abutment with the registration roller 49. Furthermore, when the toner image is sent to the secondary transfer unit 22, the recording medium is conveyed to the secondary transfer unit 22 at a timing of transferring the toner image onto a predetermined position of the recording medium.

Note that the recording medium may be sent out from a bypass feeder 51. For example, when recording media are sent out from the bypass feeder 51, the image forming apparatus 100 rotates a sheet feeding roller 50 and a sheet feeding roller 52. Next, the sheet feeding roller 50 and the sheet feeding roller 52 separate a single recording medium from the recording media on the bypass feeder 51. Furthermore, the sheet feeding roller 50 and the sheet feeding roller 52 send the separated recording medium to a sheet feeding path 53. Next, the recording medium, which is sent to the sheet feeding path 53, is sent to the registration roller 49. Note that the processes after the recording medium is sent to the registration roller 49 are the same as those of the case of sending a recording medium from the sheet feeding table 200.

The recording medium is fixed by the fixing unit 25, and discharged from the image forming apparatus 100. Next, the recording medium that is discharged from the fixing unit 25 is sent to a discharging roller 56 by a switching claw 55. Furthermore, the discharging roller 56 sends the recording medium sent to the discharging roller 56, to a paper ejection tray 57.

Furthermore, the switching claw 55 may send the recording medium that is discharged from the fixing unit 25, to the sheet reversing unit 28. In this case, the sheet reversing unit 28 reverses the front side and the back side of the recording medium sent to the sheet reversing unit 28. Next, on the reversed recording medium, an image is formed on the back side in the same manner as an image has been formed on the front side (so-called double-sided printing), and the recording medium is sent to the paper ejection tray 57.

On the other hand, the tone remaining on the intermediate transfer belt 10 is removed by the intermediate transfer body cleaning unit 17. When the remaining toner is removed, the image forming apparatus 100 prepares for the next image forming operation.

<Hardware Configuration>

Figure 2:
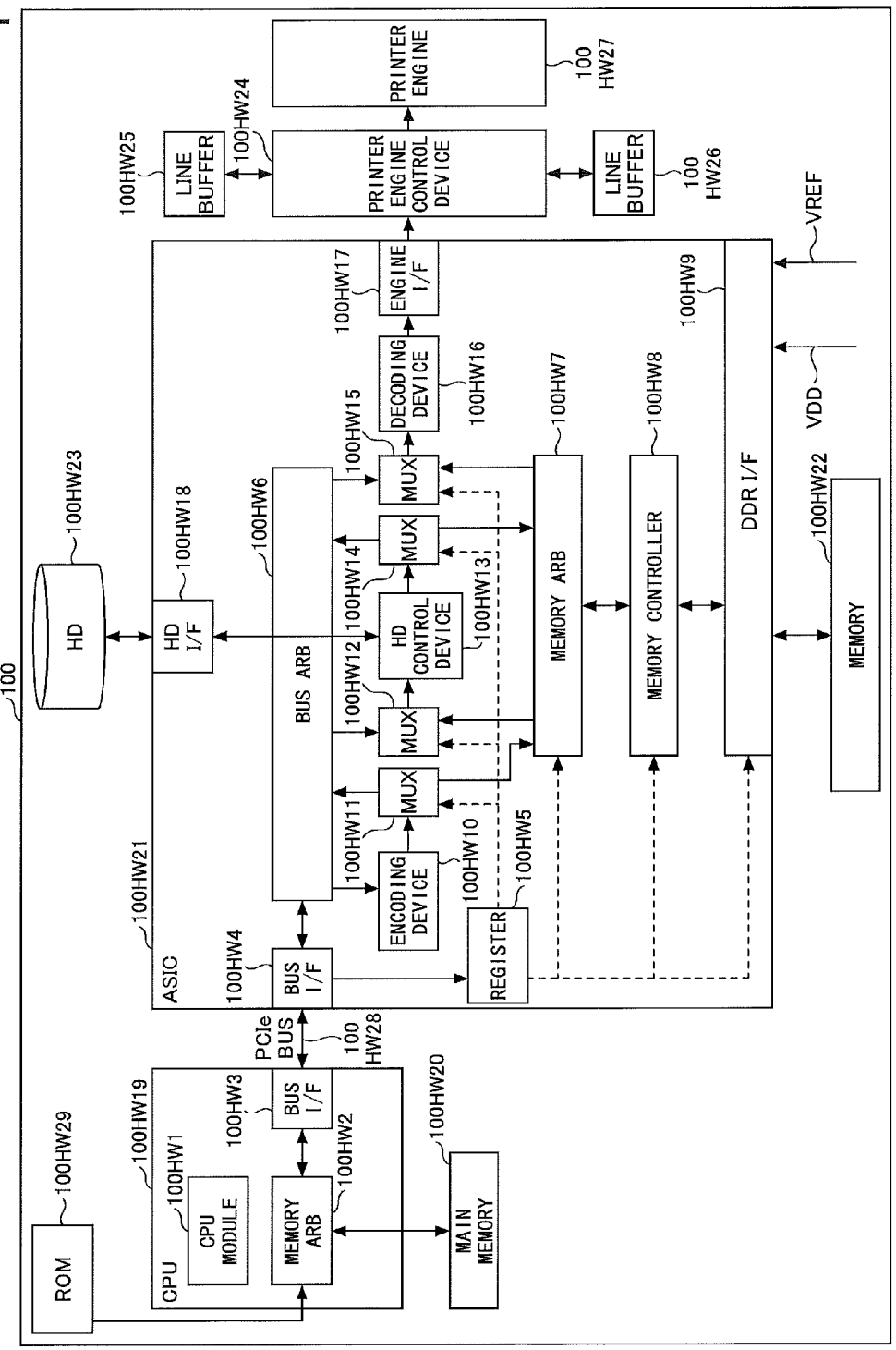
FIG. 2 is an example of a hardware block diagram of the image forming apparatus according to an embodiment of the present invention.

FIG. 2 is an example of a hardware block diagram of the image forming apparatus 100 according to an embodiment of the present invention. For example, the image forming apparatus 100 has a hardware configuration as illustrated in FIG. 2. That is, the image forming apparatus 100 includes a printer controller board on which the hardware elements illustrated in FIG. 2 are mounted. Specifically, the image forming apparatus 100 includes a printer engine 100HW27 and an ASIC 100HW21, which is an example of a first device coupled to the printer engine 100HW27 via a printer engine control device 100HW24, etc. Furthermore, the image forming apparatus 100 includes a hard disk (HD) 100HW23 coupled to the ASIC 100HW21, and a memory 100HW22 coupled to the ASIC 100HW21. Furthermore, the ASIC 100HW21 includes a Peripheral Component Interconnect express (PCIe) bus 100HW28.

Furthermore, the image forming apparatus 100 includes a Central Processing Unit (CPU) 100HW19 that is an example of a second device coupled to the ASIC 100HW21 by the PCIe bus 100HW28. Furthermore, to the CPU 100HW19, a main memory 100HW20 is coupled.

The CPU 100HW19 includes a CPU module 100HW1, a memory arbiter (ARB) 100HW2, and a bus interface (I/F) 100HW3. The CPU module 100HW1 controls the entire printer controller board. Furthermore, the CPU module 100HW1 analyzes the data in a Page Description Language (PDL) sent from an external device such as a PC, etc., and generates a CMYK image. Then, the CPU module 100HW1 stores the generated CMYK image in the main memory 100HW20.

Note that the CPU 100HW19 may be a CPU including a plurality of cores.

A memory ARB 100HW7 performs arbitration between the main memory 100HW20 and each controller. That is, the memory ARB 100HW7 arbitrates the writing of data into the main memory 100HW20, and the reading of data from the main memory 100HW20.

The bus I/F 100HW3 is an interface for sending and receiving data by the PCIe bus 100HW28. Specifically, the bus I/F 100HW3 arbitrates the respective accesses, for devices different from the CPU 100HW19, such as controllers coupled to the PCIe bus 100HW28, and the CPU 100HW19, to commonly use the PCIe bus 100HW28.

A Read-Only Memory (ROM) 100HW29 stores programs used by the CPU 100HW19, and data such as font information of characters and setting values, etc., to be set in the ASIC 100HW21.

The main memory 100HW20 stores programs used by the CPU 100HW19 and data such as CMYK images, etc. That is, the main memory 100HW20 becomes a work area when the CPU 100HW19 performs various processes. Furthermore, for example, a third storage unit is realized by the main memory 100HW20, etc.

The PCIe bus 100HW28 is an example of a serial bus coupling the CPU 100HW19 and the ASIC 100HW21. Note that the type of bus is not limited to PCIe. That is, the PCIe bus 100HW28 may be a different type of bus from PCIe. In the example described below, the PCIe bus 100HW28 is PCIe. Furthermore, the number of lanes of the PCIe bus 100HW28 may be a plural number.

The ASIC 100HW21 inputs image data (hereinafter referred to as "input image data") via the PCIe bus 100HW28. Furthermore, the image to be the input image data is, for example, the CMYK images, etc., stored in the main memory 100HW20. That is, as illustrated in FIG. 2, a bus I/F 100HW4 included in the ASIC 100HW21 inputs the input image data via the PCIe bus 100HW28 from the CPU 100HW19.

Also, the ASIC 100HW21 inputs a setting value, etc., via the PCIe bus 100HW28. Specifically, the ASIC 100HW21 inputs a mode setting value, etc. Next, when a mode setting value, etc., is input, the bus I/F 100HW4 sets the mode setting value in a register 100HW5. Then, based on the setting value, etc., set in the register 100HW5, the ASIC 100HW21 switches the mode. Note that the mode is switched, for example, based on whether the memory 100HW22 is mounted. That is, the ASIC 100HW21 performs different operations depending on whether the memory 100HW22 is mounted. Details of the respective operations based on the mode are described below.

For example, based on the mode setting value, etc., indicating the mode, the ASIC 100HW21 switches the settings of the memory ARB 100HW7, a memory controller 100HW8, a Double-Data-Rate Synchronous Dynamic Access Memory (DDR) I/F 100HW9, a MUX 100HW11, a MUX 100HW12, a MUX 100HW14, and a MUX 100HW15.

A bus ARB 100HW6 arbitrates a plurality of accesses from the modules to the bus I/F 100HW4. Furthermore, the memory ARB 100HW7 arbitrates a plurality of accesses from the modules to the memory controller 100HW8. Furthermore, the memory controller 100HW8 controls the memory 100HW22 via the DDR I/F 100HW9, based on accesses from the memory ARB 100HW7. Furthermore, the type of the memory 100HW22 is, for example, DDR. Furthermore, the DDR I/F 100HW9 is an example of an interface for the ASIC 100HW21 to read data from the memory 100HW22 and write data into the memory 100HW22.

Note that arbitrating means to cause one of the accesses to wait, when a write access of writing data into the memory 100HW22 and a read access of reading data stored in the memory 100HW22 occur at the same time. The access that is not waiting is first controlled, and subsequently the waiting access is controlled to be performed. That is, in the memory 100HW22, there are cases where a write access and a read access cannot be executed at the same time at once. Therefore, arbitrating means to implement control such that one of the accesses is made with priority over the other access, and the other access is caused to wait.

An encoding device 100HW10 encodes image data. Specifically, the encoding device 100HW10 encodes the input image data that is input via the bus I/F 100HW4 and a bus ARB 100HW6. Next, the encoding device 100HW10 sends an image (hereinafter referred to as "first image data"), which is encoded based on the input image data, to the MUX 100HW11. Therefore, an encoder is realized by, for example, the encoding device 100HW10, etc. In the case illustrated in FIG. 2, the MUX 100HW11 stores the first image data in the memory 100HW22, via the memory ARB 100HW7, the memory controller 100HW8, and the DDR I/F 100HW9. That is, the MUX 100HW11 switches between sending the first image data to the memory ARB 100HW7 or sending the first image data to the bus ARB 100HW6, based on the mode setting value set in the register 100HW5. Therefore, in the configuration illustrated in FIG. 2, the MUX 100HW11 is set such that the first image data is sent to the memory ARB 100HW7.

A HD control device 100HW13 controls the HD 100HW23 via a HD I/F 100HW18. Specifically, first, it is assumed that first image data stored in the memory 100HW22 is read by a memory controller 100HW9, etc. In the configuration illustrated in FIG. 2, the HD control device 100HW13 acquires the first image data that has been read, via the memory ARB 100HW7 and the MUX 100HW12, etc. That is, in the configuration illustrated in FIG. 2, the MUX 100HW12 is set to send the first image data, which is sent from the memory ARB 100HW7 to the HD control device 100HW13, based on a mode setting value set in the register 100HW5. Then, the HD control device 100HW13 stores the first image data in the HD 100HW23 via the HD I/F 100HW18. Note that in the following descriptions, the image data stored in the HD 100HW23 is referred to as "second image data". Furthermore, the HD 100HW23 stores a plurality of sheets of image data, for the purpose of jam backup, etc.

Next, the HD control device 100HW13 reads the second image data via the HD I/F 100HW18. Next, the second image data, which has been read, is stored in the memory 100HW22, via the MUX 100HW14, the memory ARB 100HW7, the memory controller 100HW8, and the DDR I/F 100HW9. That is, in the configuration illustrated in FIG. 2, the MUX 100HW14 is set to send the second image data, which is sent from the HD control device 100HW13, to the memory ARB 100HW7, based on a mode setting value set in the register 100HW5. Note that in the following descriptions, the image data stored in the memory 100HW22, based on the second image data, is referred to as "third image data".

Next, the MUX 100HW15 sends the third image data stored in the memory 100HW22, to a decoding device 100HW16. Specifically, the third image data is read from the memory 100HW22, via the memory ARB 100HW7, the memory controller 100HW8, and the DDR I/F 100HW9. Then, the MUX 100HW15 sends the third image data, which is sent from the memory ARB 100HW7, to the decoding device 100HW16. That is, in the configuration illustrated in FIG. 2, the MUX 100HW15 is set to send the third image data, which is sent from the memory 100HW22, to the decoding device 100HW16, based on a mode setting value set in the register 100HW5.

The decoding device 100HW16 decodes the image data. Specifically, the decoding device 100HW16 decodes the third image data, which is sent via the MUX 100HW15, the memory ARB 100HW7, the memory controller 100HW8, and the DDR I/F 100HW9. Therefore, a decoder is realized by, for example, the decoding device 100HW16, etc. Next, the decoding device 100HW16 outputs the image (hereinafter referred to as "output image data") decoded based on the third image data to the printer engine control device 100HW24 via an engine I/F 100HW17.

The engine I/F 100HW17 is an interface for outputting the output image data from the ASIC 100HW21 to the printer engine control device 100HW24. Furthermore, the printer engine control device 100HW24 controls the printer engine 100HW27. For example, the printer engine control device 100HW24 causes the printer engine 100HW27 to perform image forming, based on the output image data output from the engine I/F 100HW17. Specifically, first, the printer engine control device 100HW24 stores the output image data in a line buffer 100HW25 and a line buffer 100HW26. Then, in synchronization with the printer engine 100HW27, the printer engine control device 100HW24 transfers the output image data, which is stored in the line buffer 100HW25 and the line buffer 100HW26, to the printer engine 100HW27. Note that the line buffer 100HW25 and the line buffer 100HW26 may store image data of a plurality of lines.

<Overall Process>

Figure 3:
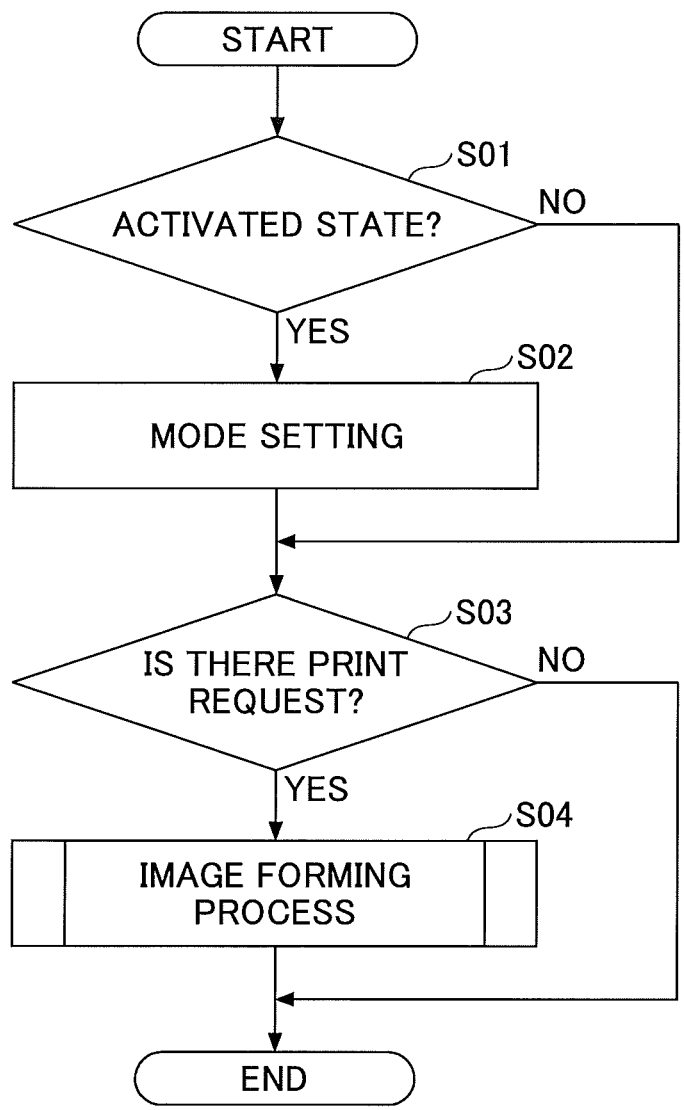
FIG. 3 is a flowchart of an example of an overall process by the image forming apparatus according to an embodiment of the present invention.

FIG. 3 is a flowchart of an example of an overall process by the image forming apparatus 100 according to an embodiment of the present invention. For example, the image forming apparatus 100 repeatedly performs the process illustrated in FIG. 3 at predetermined time intervals.

In step S01, the image forming apparatus 100 determines whether the image forming apparatus 100 is in an activated state. For example, when the power is input, the image forming apparatus 100 is activated and typically shifts to a so-called initial state, etc. In this way, when the image forming apparatus 100 is activated, the image forming apparatus 100 is in a state before various settings are made, and therefore the settings are typically not made or default values are typically set. Therefore, in step S01, the image forming apparatus 100 determines whether the image forming apparatus 100 is in a state where settings are not made, i.e., in an activated state.

Then, when the image forming apparatus 100 determines that the image forming apparatus 100 is in an activated state (YES in step S01), the image forming apparatus 100 proceeds to step S02. On the other hand, when the image forming apparatus 100 determines that the image forming apparatus 100 is not in an activated state (NO in step S01), the image forming apparatus 100 proceeds to step S03.

In step S02, the image forming apparatus 100 sets a mode. Specifically, the image forming apparatus 100 writes a setting value, etc., in the register 100HW5 (FIG. 2). Note that a setting value, etc., is input to the ROM 100HW29 (FIG. 2), etc., in advance. In this way, the image forming apparatus 100 switches the setting of a MUX 100HW10, etc., based on the setting value, etc., written in the register 100HW5. In the following, a description is given of an example in which the mode differs depending on whether the image forming apparatus 100 has a configuration including the memory 100HW22 (FIG. 2). That is, as illustrated in FIG. 2, when the configuration includes the memory 100HW22, the image forming apparatus 100 writes a setting value, etc., in the register 100HW5, to shift to the mode for a case where the memory 100HW22 is included. Note that the configuration where the image forming apparatus 100 does not include the memory 100HW22, and the mode for a case where the memory 100HW22 is not included, is described below. First, a description is given of a mode for case where the memory 100HW22 is included. Furthermore, the image forming apparatus 100 may make further settings other than the mode.

In step S03, the image forming apparatus 100 determines whether there is a print request. For example, the image forming apparatus 100 accepts a print request according to an operation by a user with respect to an external device such as a PC, etc., or a start button, etc. That is, when there is an image to be formed, the user performs an operation such that a print request is input to the image forming apparatus 100. Next, when the image forming apparatus 100 determines that there is a print request (YES in step S03), the image forming apparatus 100 proceeds to step S04. On the other hand, when the image forming apparatus 100 determines that there is no print request (NO in step S03), the image forming apparatus 100 ends the process.

In step S04, the image forming apparatus 100 performs an image forming process. First, when there is a print request, the image forming apparatus 100 receives document data, etc., from an external device, etc., or reads an image to be formed on a sheet, etc., with a scanner, and inputs the data indicating the image that is the target of the print request. Then, the image forming apparatus 100 performs, for example, the image forming process as follows, and forms the image, which is the target of the print request, on a sheet, etc.

Figure 4:
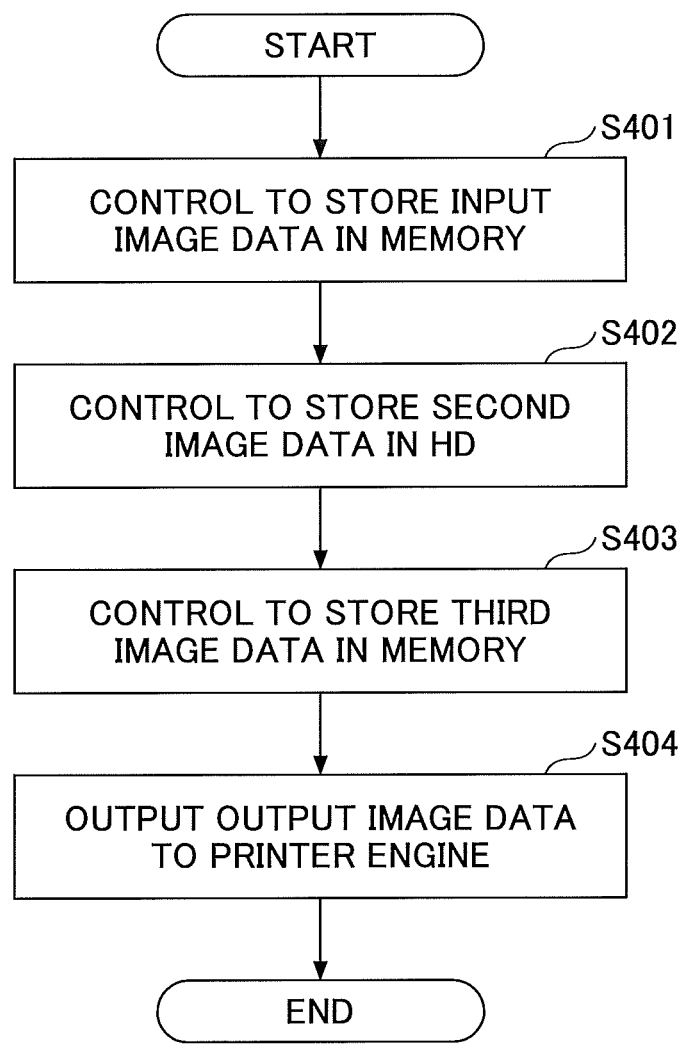
FIG. 4 is a flowchart of an example of an image forming process performed by the image forming apparatus according to an embodiment of the present invention.

FIG. 4 is a flowchart of an example of an image forming process performed by the image forming apparatus 100 according to an embodiment of the present invention. The process illustrated in FIG. 4 is an example of the process of step S04 of FIG. 3. Note that the following process is an example of a process performed in the configuration illustrated in FIG. 2.

In step S401, the image forming apparatus 100 implements control to store the input image data in the memory 100HW22 (FIG. 2). First, when there is a print request, the CPU 100HW19 generates input image data, and stores the input image data in the main memory 100HW20 (FIG. 2). Then, in step S401, the image forming apparatus 100 inputs the input image data, which is stored in the main memory 100HW20, via the PCIe bus 100HW28 (FIG. 2). Next, in step S401, when the input image data is input via the PCIe bus 100HW28, the image forming apparatus 100 stores the image data in the memory 100HW22 via the MUX 100HW11 (FIG. 2).

Note that the input image data is preferably encoded. When the image data is encoded, the image forming apparatus 100 is typically able to reduce the data volume of the image data. Therefore, the image forming apparatus 100 preferably encodes the input image data by the encoding device 100HW10, to obtain the first image data. That is, the input image data is encoded to obtain the first image data, which is image data having lower data volume than the data volume of the input image data. Therefore, when the input image data is encoded, the data volume of the image data, which is to be stored in the memory 100HW22, becomes lower than the data volume of the image data in the case of storing the input image data (without encoding). Therefore, by encoding the input image data, the image forming apparatus 100 is able to reduce the storage capacity of the memory 100HW22. Furthermore, when the data volume is low, the image forming apparatus 100 is able to reduce the time taken to write and read the data, i.e., the data transfer time. The following describes an example in which the input image data is encoded to generate the first image data.

Furthermore, the storage area of the memory 100HW22 preferably includes a storage area for storing the first image data. That is, the storage area of the memory 100HW22 preferably includes a storage area for storing the first image data (hereinafter referred to as "first storage area") and a storage area for storing the third image data (hereinafter referred to as "second storage area"). In this way, the storage area of the memory 100HW22 is preferably separated into the first storage area and the second storage area. For example, the first storage area and the second storage area have different banks. Accordingly, the process of reading and writing the first image data and the process of reading and writing the third image data can be separately performed, and therefore the image forming apparatus 100 is able to increase the speed of processes performed with respect to the memory 100HW22.

In step S402, the image forming apparatus 100 implements control to store the second image data in the HD 100HW23 (FIG. 2). Specifically, first, the image forming apparatus 100 reads the first image data, which is stored in step S401, from the first storage area of the memory 100HW22, by the HD control device 100HW13. Then, the image forming apparatus 100 stores the second image data in the HD 100HW23 based on the first image data, by the HD control device 100HW13.

In step S403, the image forming apparatus 100 implements control to store the third image data in the memory 100HW22. Specifically, when a request is received from the printer engine 100HW27 (FIG. 2), the image forming apparatus 100 reads the second image data, which is stored in step S402, from the HD 100HW23, by the HD control device 100HW13. Next, the image forming apparatus 100 stores the third image data in the second storage area of the memory 100HW22, based on the second image data, by the MUX 100HW14, etc.

In step S404, the image forming apparatus 100 outputs the output image data to the printer engine. Specifically, the image forming apparatus 100 first reads the third image data, which has been stored in the second storage area of the secondary transfer unit 22 in step S403. Then, the image forming apparatus 100 outputs the output image data to the printer engine 100HW27 via the printer engine control device 100HW24 (FIG. 2), by the MUX 100HW15 (FIG. 2).

Note that when the third image data is image data that has been encoded by the encoding device 100HW10, the image forming apparatus 100 decodes the third image data by the decoding device 100HW16, to generate the output image data.

Furthermore, in step S404, the image forming apparatus 100 preferably outputs the output image data at a predetermined data transfer speed, to the printer engine 100HW27. That is, the image forming apparatus 100 preferably periodically outputs the output image data at a substantially fixed speed. The printer engine 100HW27 typically operates at a fixed speed, at least while forming an image of one page. Therefore, when an image is being formed by the printer engine 100HW27, the image forming apparatus 100 preferably outputs the output image data to the printer engine 100HW27, at a data transfer speed that matches the operation speed of the printer engine 100HW27. That is, it is preferable that output image data corresponding to one page is periodically sent to the printer engine 100HW27. That is, the output image data corresponding to one page is preferably sent to the printer engine 100HW27 at a fixed speed, without being interrupted, and without the intervals being varied.

In this way, when the output image data is output at a fixed speed, the image forming apparatus 100 is able to reduce cases where there is a deficiency or an excess in the output image data, for the printer engine 100HW27 to form images.

The printer engine 100HW27 operates at a fixed speed, and thus uses predetermined output image data at fixed intervals. Therefore, when there is a deficiency in the output image data, when the printer engine 100HW27 is to use the output image data, the printer engine 100HW27 is unable to form an image. Therefore, the part where the printer engine 100HW27 is unable to form an image, will appear to be a chipped part in the image. Furthermore, when there is excessive output image data, there may be cases where the output image data does not fit in the line buffer 100HW25 (FIG. 2). Therefore, there may be cases where the output image data, which is not yet used by the printer engine 100HW27, is overwritten and erased.

Thus, if the output image data is output to the printer engine 100HW27 at a predetermined data transfer speed in synchronization with the operation speed of the printer engine 100HW27, the image forming apparatus 100 would be able to reduce the deficiency or the excess in the output image data. In this way, it is possible to reduce cases where the formed image is chipped, and cases where the intended output image data is erased and an image that is different from the input image is erroneously formed, etc.

Therefore, by the overall process, for example, the data will flow as follows.

Figure 5:
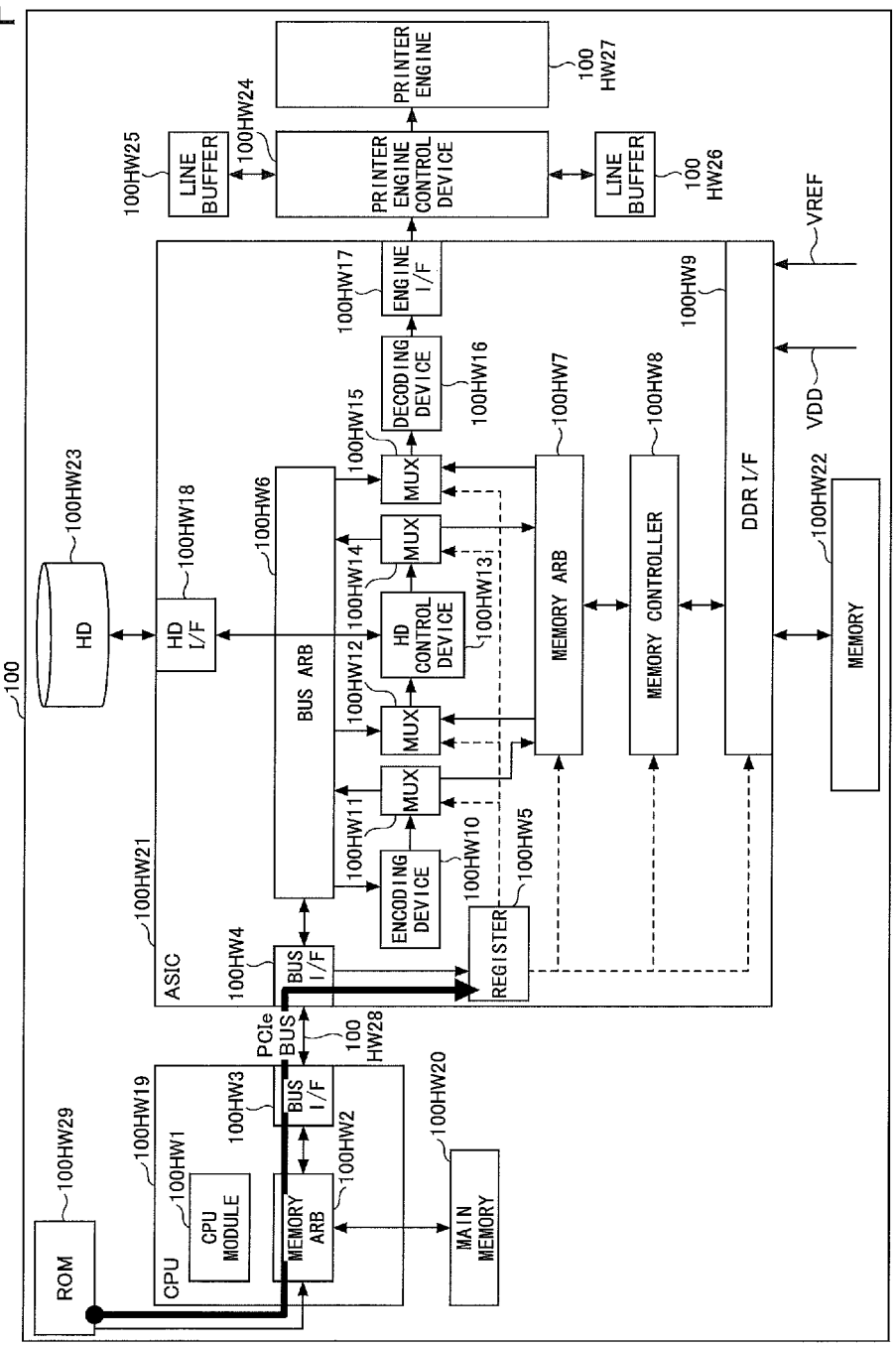
FIG. 5 is a block diagram illustrating an example of a flow of data in the mode setting according to an embodiment of the present invention.

FIG. 5 is a block diagram illustrating an example of a flow of data in the mode setting according to an embodiment of the present invention. That is, when step S302 of FIG. 3 is performed, for example, the data flows as illustrated in FIG. 5. Specifically, in mode setting, a setting value, etc., is set based on the mode, in the register 100HW5. Furthermore, the setting value, etc., set in the register 100HW5 is stored in the ROM 100HW29 in advance. Therefore, the setting value, etc., is read from the ROM 100HW29, and set in the register 100HW5 via the PCIe bus 100HW28 and the bus I/F 100HW4. Furthermore, when the register 100HW5 is set, the MUX 100HW11 will have a setting to match the mode, based on the setting value, etc.

Figure 6:
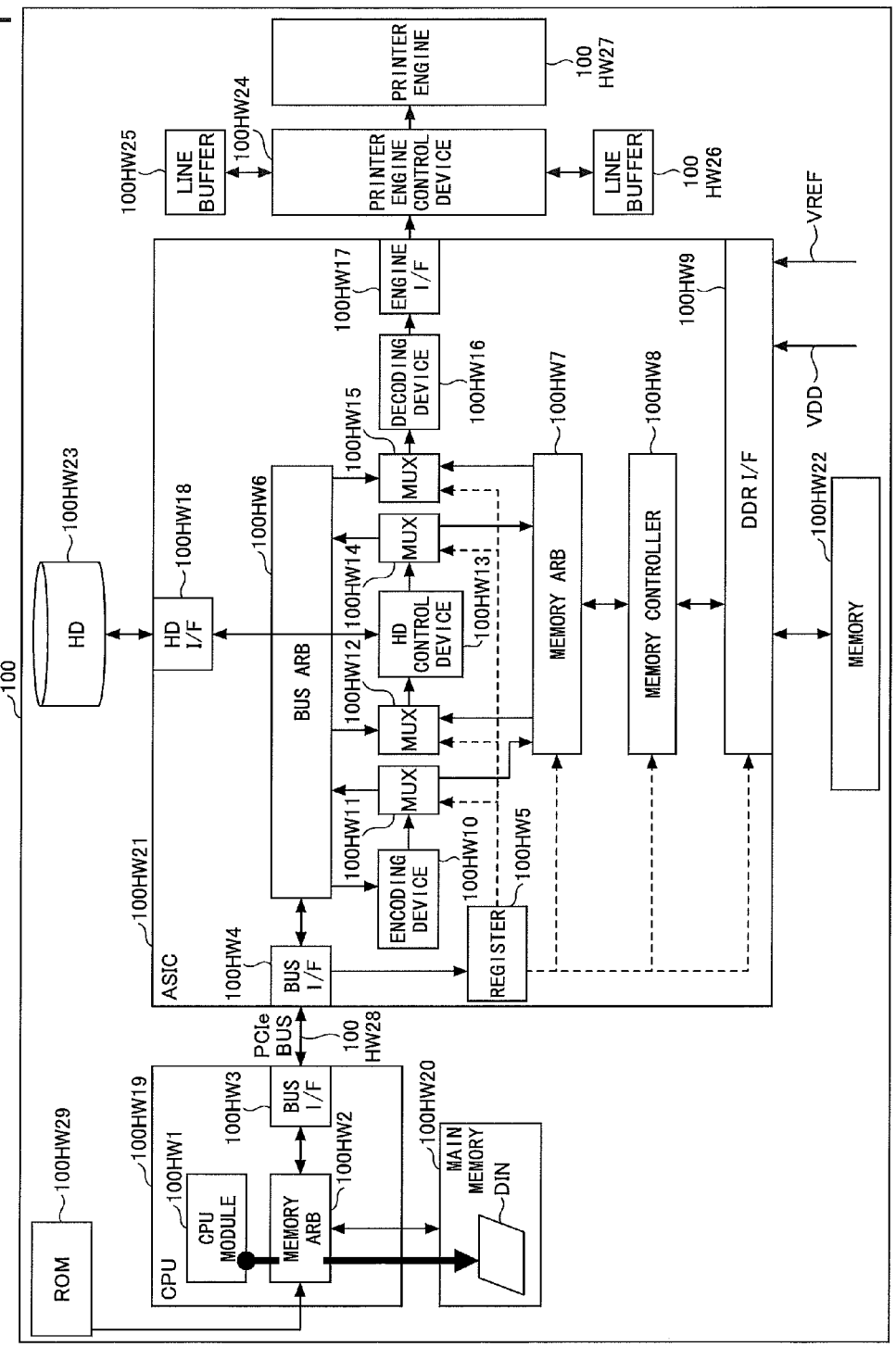
FIG. 6 is a block diagram illustrating an example of a flow of data in the generation of input image data according to an embodiment of the present invention.

FIG. 6 is a block diagram illustrating an example of a flow of data in the generation of the input image data according to an embodiment of the present invention. That is, when the image forming apparatus 100 determines that there is a print request in step S03 of FIG. 3 (YES in step S03), data indicating an image that is the target of the print request is input to the image forming apparatus 100. Then, the CPU module 100HW1 draws the data indicating the input image, to generate input image data DIN. As illustrated in FIG. 6, the generated input image data DIN is stored in the main memory 100HW20.

Figure 7:
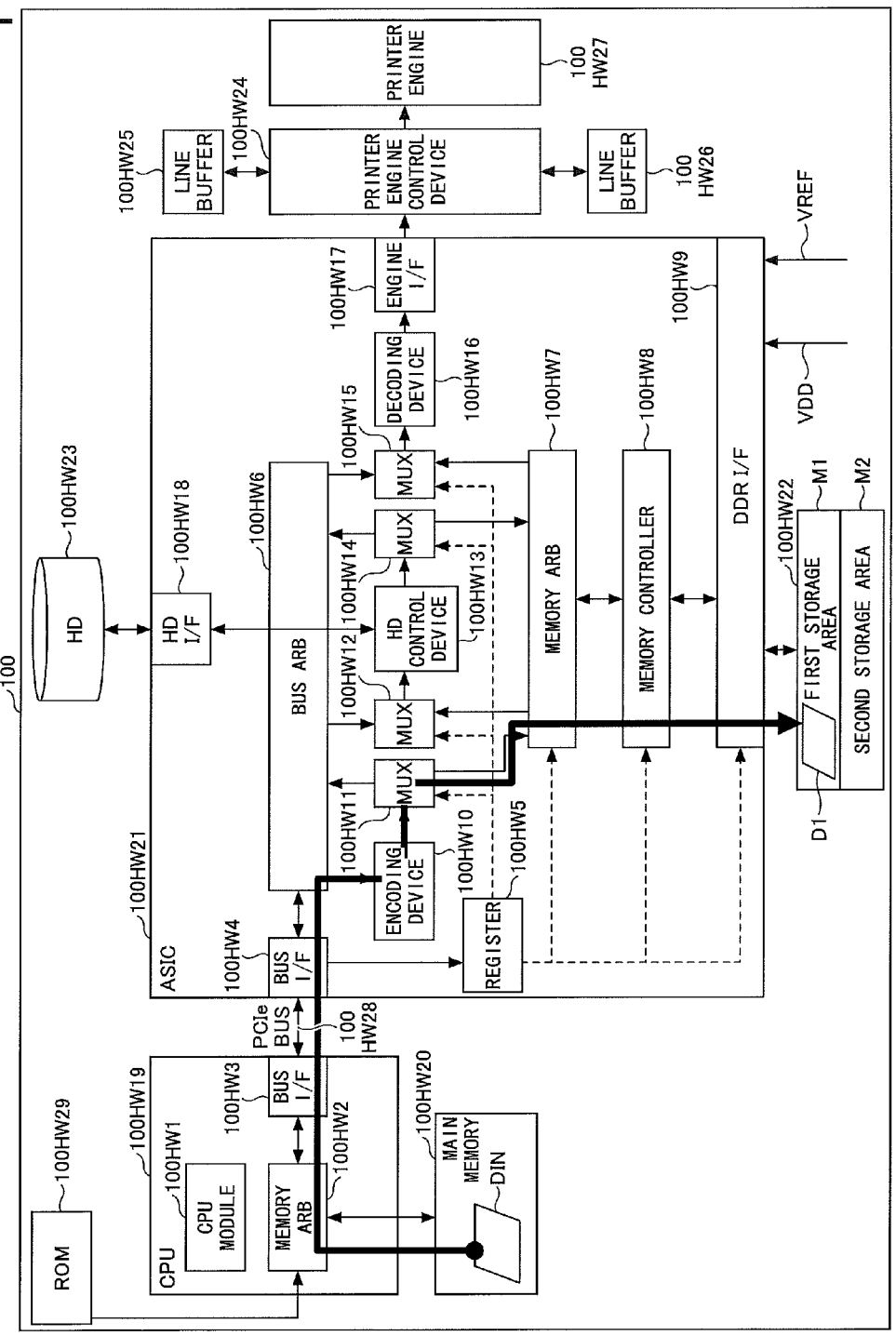
FIG. 7 is a block diagram illustrating an example of a flow of data relevant to first image data according to an embodiment of the present invention.

FIG. 7 is a block diagram illustrating an example of a flow of data relevant to the first image data according to an embodiment of the present invention. That is, when step S401 of FIG. 4 is performed, for example, the data flows as illustrated in FIG. 7. Specifically, the input image data DIN that is stored in the main memory 100HW20, is input via the PCIe bus 100HW28. Then, in the configuration illustrated in FIG. 7, when the input image data DIN is input, the input image data DIN is encoded by the encoding device 100HW10, and first image data D1 is generated. Furthermore, based on the setting value, etc., set in the register 100HW5, the MUX 100HW11 is set in advance so as to send the first image data D1, which is sent from the encoding device 100HW10, to the memory ARB 100HW7. Therefore, the first image data D1, which is sent from the encoding device 100HW10, is stored in a first storage area M1 of the memory 100HW22.

Figure 8:
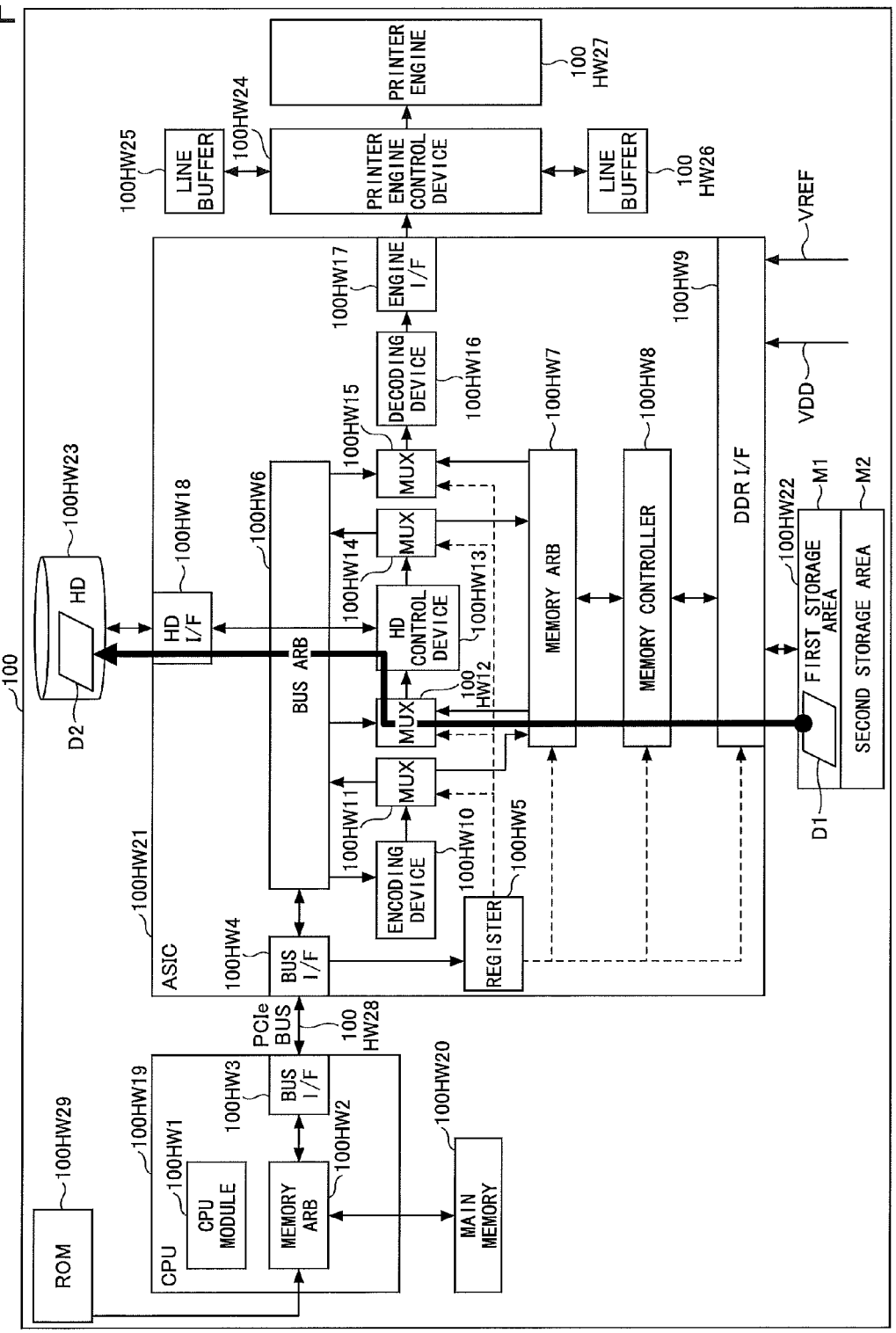
FIG. 8 is a block diagram illustrating an example of a flow of data relevant to second image data according to an embodiment of the present invention.

FIG. 8 is a block diagram illustrating an example of a flow of data relevant to the second image data according to an embodiment of the present invention. That is, when step S402 of FIG. 4 is performed, for example, the data flows as illustrated in FIG. 8. As illustrated in FIG. 8, the first image data D1, which is stored in the first storage area M1 of the memory 100HW22, is sent to the HD control device 100HW13 by the MUX 100HW12, etc. Furthermore, based on a setting value, etc., set in the register 100HW5, the MUX 100HW12 is set in advance so as to send the first image data D1, which is sent from the memory ARB 100HW7, to the HD control device 100HW13.

Figure 9:
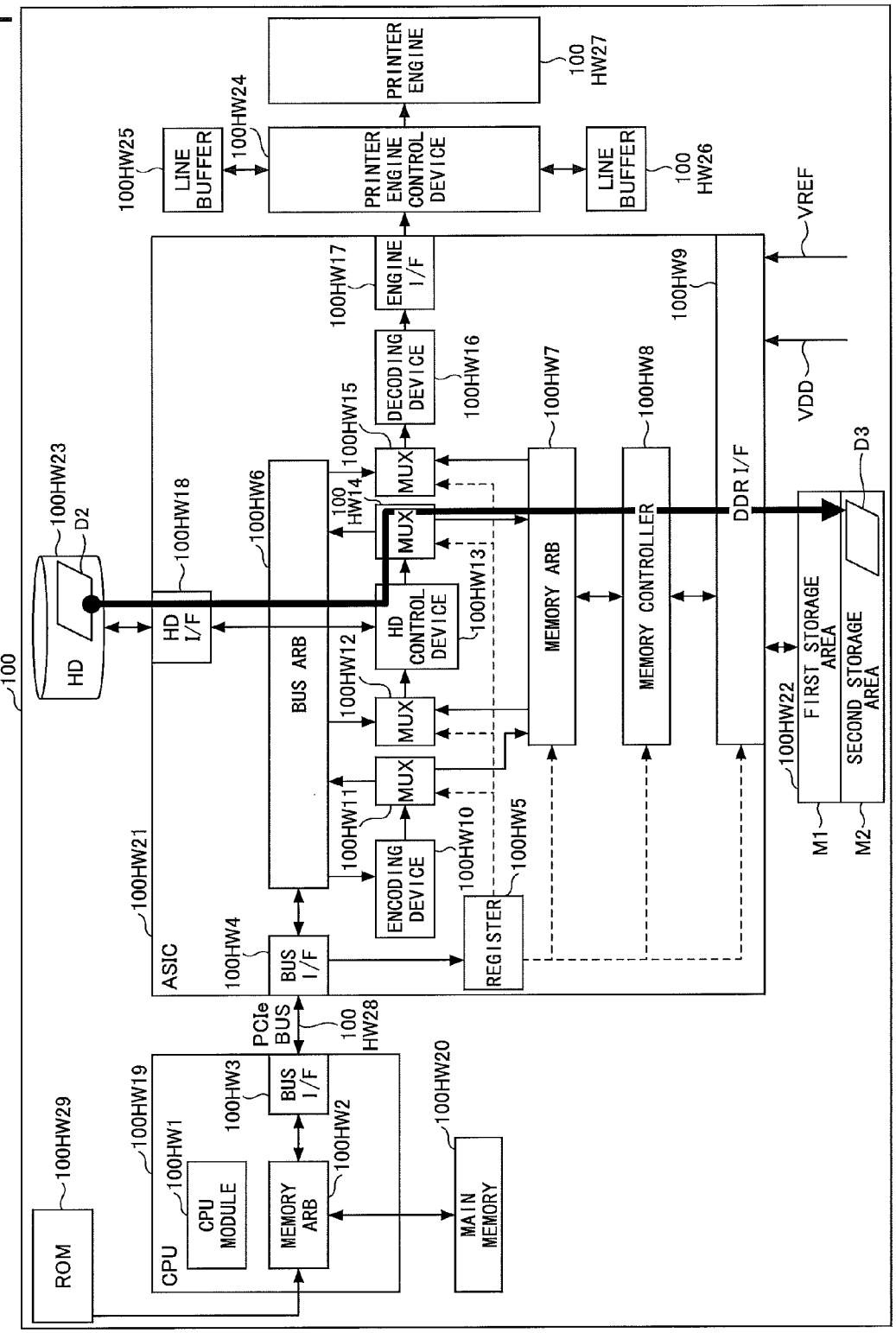
FIG. 9 is a block diagram illustrating an example of a flow of data relevant to third image data according to an embodiment of the present invention.

FIG. 9 is a block diagram illustrating an example of a flow of data relevant to the third image data according to an embodiment of the present invention. That is, when step S403 of FIG. 4 is performed, for example, the data flows as illustrated in FIG. 9. As illustrated in FIG. 9, second image data D2 stored in the HD 100HW23 is read by the HD control device 100HW13, and stored in a second storage area M2 of the memory 100HW22 by the MUX 100HW14, etc. Furthermore, based on a setting value, etc., set in the register 100HW5, the MUX 100HW12 is set in advance so as send the second image data D2, which is sent from the HD control device 100HW13, to the memory ARB 100HW7.

Figure 10:
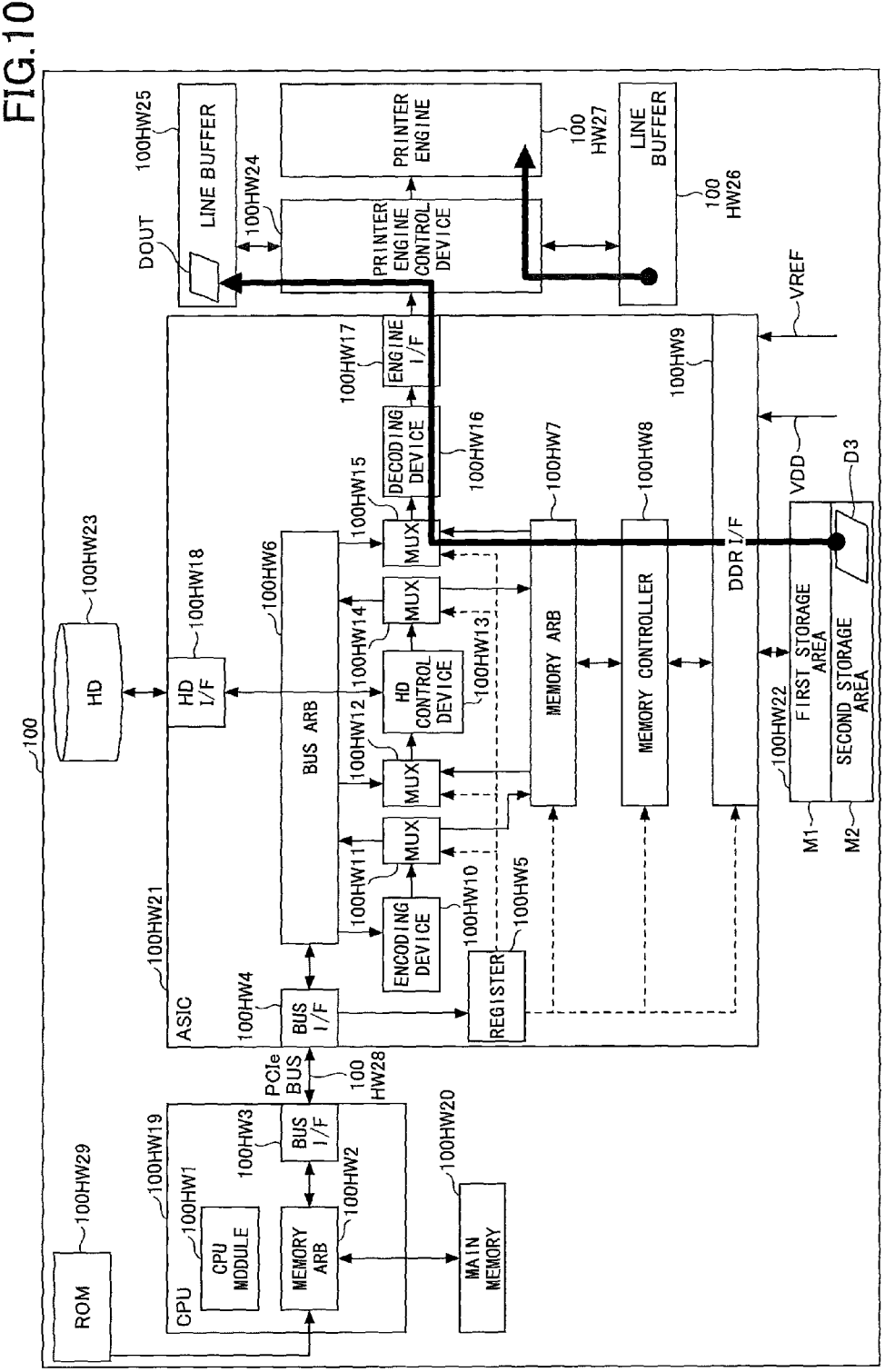
FIG. 10 is a block diagram illustrating an example of a flow of data relevant to output image data according to an embodiment of the present invention.

FIG. 10 is a block diagram illustrating an example of a flow of data relevant to the output image data according to an embodiment of the present invention. That is, when step S404 of FIG. 4 is performed, for example, the data flows as illustrated in FIG. 10. As illustrated in FIG. 10, when a request is received from the printer engine 100HW27, third image data D3, which is stored in the second storage area M2 of the memory 100HW22, is decoded, and output image data DOUT is output to the printer engine 100HW27 by the MUX 100HW15, etc. As illustrated in FIG. 10, first, the output image data DOUT is stored in the line buffer 100HW25. Then, when a predetermined data volume is stored in the line buffer, as in the line buffer 100HW26 illustrated in FIG. 10, the output image data DOUT is output to the printer engine 100HW27. In this way, the printer engine control device 100HW24 alternately switches between two line buffers, to store and output the output image data DOUT.

As described above, when the transmission destination of the image data, which is stored in the HD 100HW23, is the memory 100HW22, as illustrated in FIG. 10, the ASIC 100HW21 can output the output image data DOUT to the printer engine 100HW27, based on the third image data D3 stored in the memory 100HW22. When the output image data DOUT is output by this path, compared to the case of outputting the output image data DOUT via the PCIe bus 100HW28, the competition for using the bus can be reduced. Note that a comparison example, has a configuration, for example, as follows.

Figure 11:
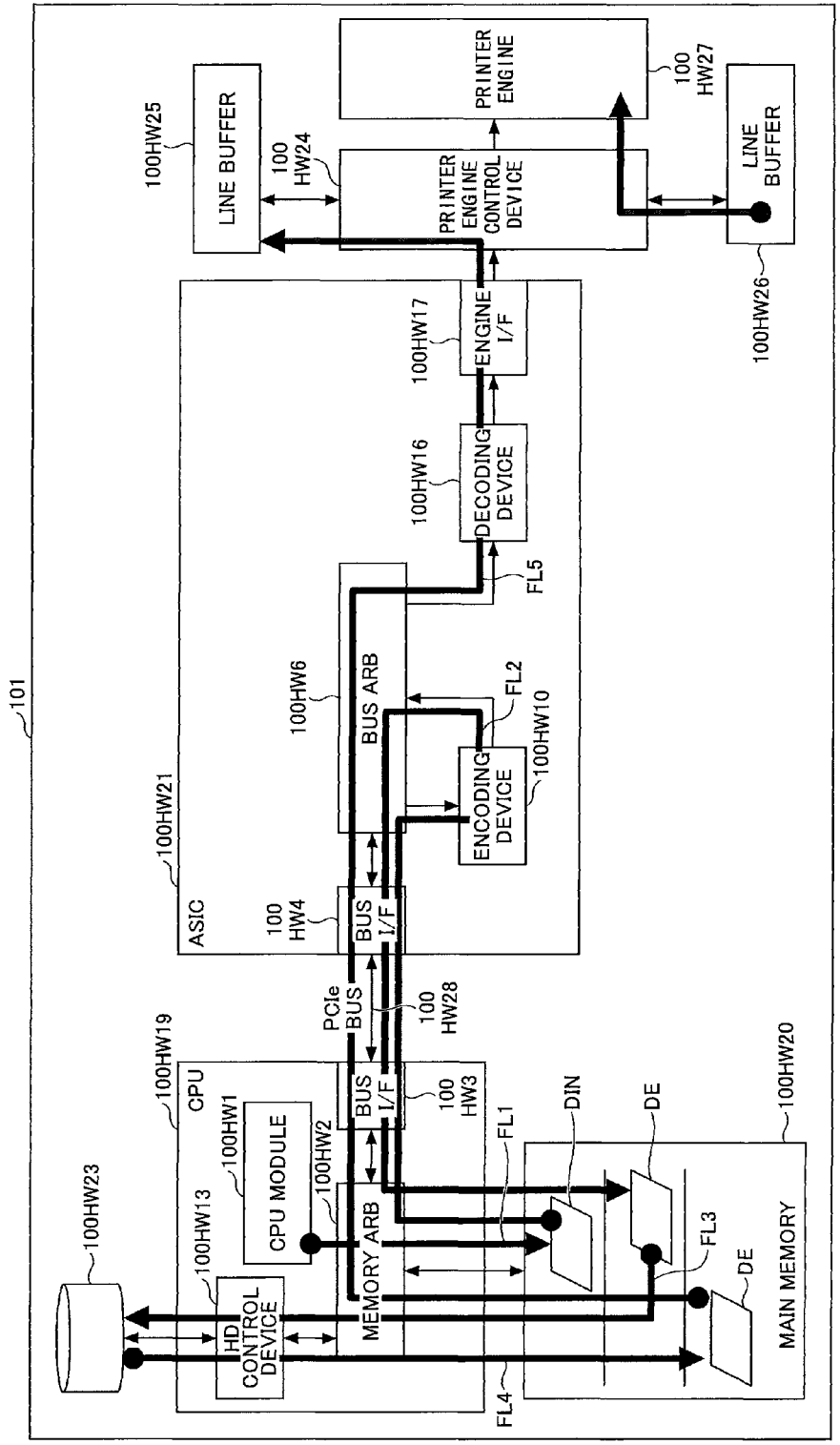
FIG. 11 is a block diagram illustrating an example of a hardware configuration and a flow of data of an image forming apparatus according to a comparison example.

FIG. 11 is a block diagram illustrating an example of a hardware configuration and a flow of data of an image forming apparatus according to a comparison example. For example, as illustrated in FIG. 11, an image forming apparatus 101 according to a comparison example has a hardware configuration including the CPU 100HW19, the main memory 100HW20, the ASIC 100HW21, and the printer engine 100HW27, etc. Compared to the hardware configuration illustrated in FIG. 2, the HD 100HW23 is coupled to the CPU 100HW19 in the configuration of FIG. 11. Furthermore, compared to the hardware configuration illustrated in FIG. 2, the configuration of FIG. 11 does not include the memory 100HW22, and is thus different from the configuration of FIG. 2 in that the main memory 100HW20 stores the input image data and the encoded image data (hereinafter referred to as "encoded image data").

In the image forming apparatus 101 according to the comparison example, for example, by the same method as in the configuration of FIG. 2, first, the input image data DIN is generated. Furthermore, similar to the configuration of FIG. 2, the input image data DIN is stored in the main memory 100HW20. Note that in FIG. 11, a first data flow FL1 indicates the flow of the input image data DIN.

When the process of the first data flow FL1 is performed, next, a process of a second data flow FL2 is performed. For example, in the image forming apparatus 101 according to the comparison example, when encoding the input image data DIN, first, the input image data DIN is input to the ASIC 100HW21 via the PCIe bus 100HW28. Next, the encoding device 100HW10 encodes the input image data DIN that has been input, and generates encoded image data DE. Next, the encoding device 100HW10 sends the encoded image data DE to the bus ARB 100HW6. Next, the bus ARB 100HW6 sends the encoded image data DE to the main memory 100HW20 via the PCIe bus 100HW28, and the encoded image data DE is stored in the main memory 100HW20.

When the process of the second data flow FL2 is performed, next, a process of a third data flow FL3 is performed. Specifically, in the third data flow FL3, the HD control device 100HW13 stores the encoded image data DE in the HD 100HW23.

Next, when the process of the third data flow FL3 is performed, next, processes of a fourth data flow FL4 and a fifth data flow FL5 are performed. Specifically, when a request is received from the printer engine 100HW27, first, the HD control device 100HW13 performs a process of the fourth data flow FL4. In the fourth data flow FL4, the encoded image data DE is read from the HD 100HW23, and the encoded image data DE is stored in the main memory 100HW20. Next, when the process of the fourth data flow FL4 is performed, a process of the fifth data flow FL5 is performed. Specifically, first, the CPU 100HW19 inputs the encoded image data DE in the ASIC 100HW21 via the PCIe bus 100HW28. Next, the decoding device 100HW16 generates output image data by decoding the encoded image data DE. Then, the output image data is output to the printer engine 100HW27.

In the above configuration, as illustrated in FIG. 11, the PCIe bus 100HW28 is used for a total of three times to send and receive image data; i.e., two times in the second data flow FL2 and one time in the fifth data flow FL5. On the other hand, in the configuration of FIG. 2, for example, the PCIe bus 100HW28 is used once in the flow of data illustrated in FIG. 7. That is, the number of times of using the PCIe bus 100HW28 in the image forming apparatus can be reduced by the configuration of FIG. 2.

The PCIe bus 100HW28 is often used for sending data that is different from the data used by the ASIC 100HW21. For example, a device such as a scanner, etc., which is different from the ASIC 100HW21, may use the PCIe bus 100HW28. That is, the PCIe bus 100HW28 is commonly used by devices other than the ASIC 100HW21. For example, in this case, the image data, etc., acquired by a scanner is sent and received via the PCIe bus 100HW28.

Therefore, when an attempt is made to send and receive data via the PCIe bus 100HW28, while another device such as a scanner is using the PCIe bus 100HW28, a competition for using the PCIe bus 100HW28 will occur. Note that even by setting priority levels, a competition for using the bus may occur. In this way, when a competition for using the bus occurs, it is difficult for the image forming apparatus to send and receive data between the ASIC 100HW21 and the CPU 100HW19 via the PCIe bus 100HW28. Therefore, by using the configuration of FIG. 2 to reduce the number of times of using the PCIe bus 100HW28, the image forming apparatus 100 can reduce the occurrence of competitions for using the PCIe bus 100HW28.

Furthermore, by reducing the frequency of using the PCIe bus 100HW28, the image forming apparatus 100 is able to reduce the number of lanes in the PCIe bus 100HW28. In this way, by reducing the number of lanes of the PCIe bus 100HW28, for example, the cost can be reduced in the image forming apparatus 100.

In the comparison example of FIG. 11, for example, at the time of the second data flow FL2 and the fifth data flow FL5, when a competition for using the bus occurs, it becomes difficult to send and receive image data between the ASIC 100HW21 and the CPU 100HW19. Particularly, in the fifth data flow FL5, when mage data cannot be sent to the ASIC 100HW21, at the printer engine 100HW27 that is at the subsequent stage, a deficiency may arise in the output image data. On the other hand, in the configuration of FIG. 2, the image forming apparatus 100 can store a sufficient amount of image data in the HD 100HW23, and subsequently output the output image data DOUT to the printer engine 100HW27. Therefore, even when a competition for using a bus occurs as illustrated in FIG. 10, in the configuration of FIG. 2, the image forming apparatus 100 is able to output the output image data DOUT to the printer engine 100HW27. Therefore, the image forming apparatus 100 can reduce cases where a deficiency in the output image data DOUT occurs in the printer engine 100HW27, and can reduce the deterioration of the image quality caused by a deficiency in the output image data DOUT.

Particularly, even when image forming is performed at high speed, the image forming apparatus 100 is able to reduce the occurrence of a deficiency in the output image data DOUT in the printer engine 100HW27. Note that high speed is a print condition of, for example, 1200 dots per inch (dpi) and greater than or equal to 80 pages per minute (ppm).

Furthermore, in the configuration of FIG. 2, the encoding device 100HW10 encodes the input image data DIN, and generates the first image data D1. Therefore, until the image data is decoded at the decoding device 100HW16, the image data is encoded, and therefore the data volume of the image data is often low. Therefore, by the configuration of FIG. 2, it is possible to reduce the data capacity of storage devices such as the HD 100HW23 and the memory 100HW22. Furthermore, when the data capacity of each storage device is small, the cost can be reduced. Furthermore, when the data volume of the second image data D2 (FIG. 9) stored in the HD 100HW23 is low, the image forming apparatus 100 can reduce the writing time of writing the second image data D2 and the reading time of reading the second image data D2, with respect to the HD 100HW23. In the configuration of FIG. 2, the writing time with respect to the HD 100HW23 is often the greatest bottleneck. Therefore, by reducing the writing time with respect to the HD 100HW23, the image forming apparatus 100 can perform processes at high speed.

Also, in the configuration of FIG. 2, due to the variation in the complexity of the image being handled, the time taken by the CPU 100HW19 to generate the input image data DIN may vary. Furthermore, when the encoding format is arithmetic encoding, predictive encoding, dictionary encoding, or run-length encoding, the data volume of the image data after encoding will vary depending on the image. Note that in dictionary encoding, first, the data that is the target of encoding is registered, and a dictionary is generated. Furthermore, in the dictionary, the numbers, etc., that are replaced by the encoding, are input. Then, when there is data registered in the dictionary, based on the dictionary, the encoding device 100HW10 performs encoding by replacing the numbers, etc., input in the dictionary. Furthermore, the encoding may be so-called static encoding in which updating is not performed during the encoding, or so-called dynamic encoding in which updating is performed during the encoding.

Furthermore, even if the data volume is the same, the writing time and the reading time with respect to a hard disk may vary, depending on whether the writing portion or the reading portion is on the outer periphery of the hard disk or on the inner periphery of the hard disk. In this way, the time taken from when the input image data DIN is generated to when the second image data D2 is stored in the HD 100HW23, may vary due to various factors, even when the same image is handled. Here, by the configuration of FIG. 2, it is possible to reduce the factors causing the variation in the time from when the second image data D2 is read from the HD 100HW23 to when the output image data DOUT is output to the printer engine 100HW27. Therefore, the image forming apparatus 100 can output the output image data DOUT to the printer engine 100HW27 at substantially fixed intervals.

Furthermore, the ASIC 100HW21 illustrated in FIG. 2 is preferably a device that is used in a second image forming apparatus having the following hardware configuration.

Figure 12:
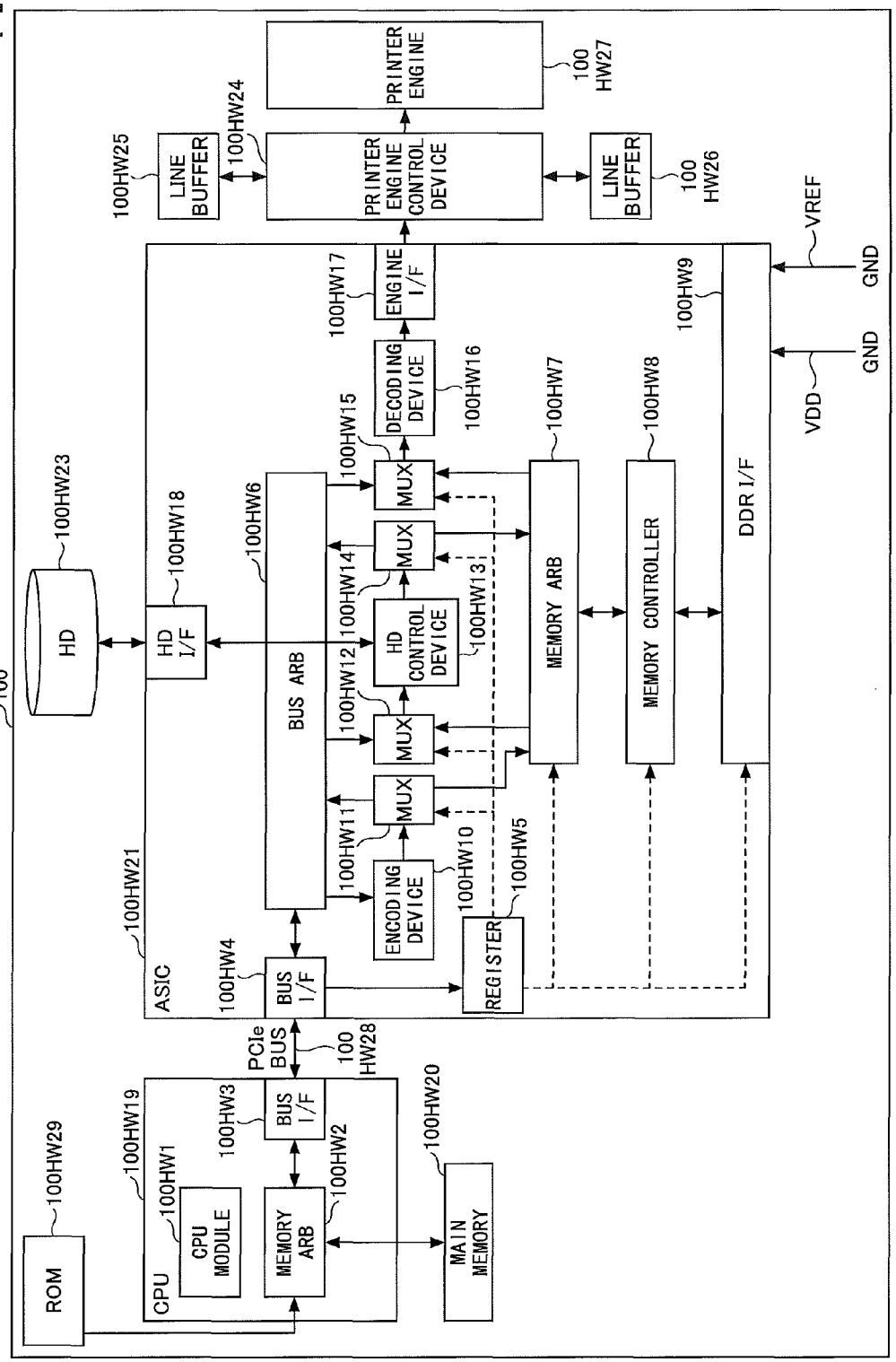
FIG. 12 is an example of a hardware block diagram of a second image forming apparatus according to an embodiment of the present invention.

FIG. 12 is an example of a hardware block diagram of a second image forming apparatus according to an embodiment of the present invention. Compared to the hardware configuration illustrated in FIG. 2, the hardware configuration of a second image forming apparatus 102 is different in that the memory 100HW22 is not included. Note that the same elements as those of the hardware configuration of FIG. 2 are denoted by the same reference numerals and redundant descriptions are omitted.

For example, the second image forming apparatus 102 is used when forming images at a lower speed than that of the image forming apparatus 100 of FIG. 2. Furthermore, in the configuration of FIG. 12, the second image forming apparatus 102 sets a mode for a configuration without the memory 100HW22, and operates in the mode that has been set. Specifically, the second image forming apparatus 102 performs the following overall process.

Figure 13:
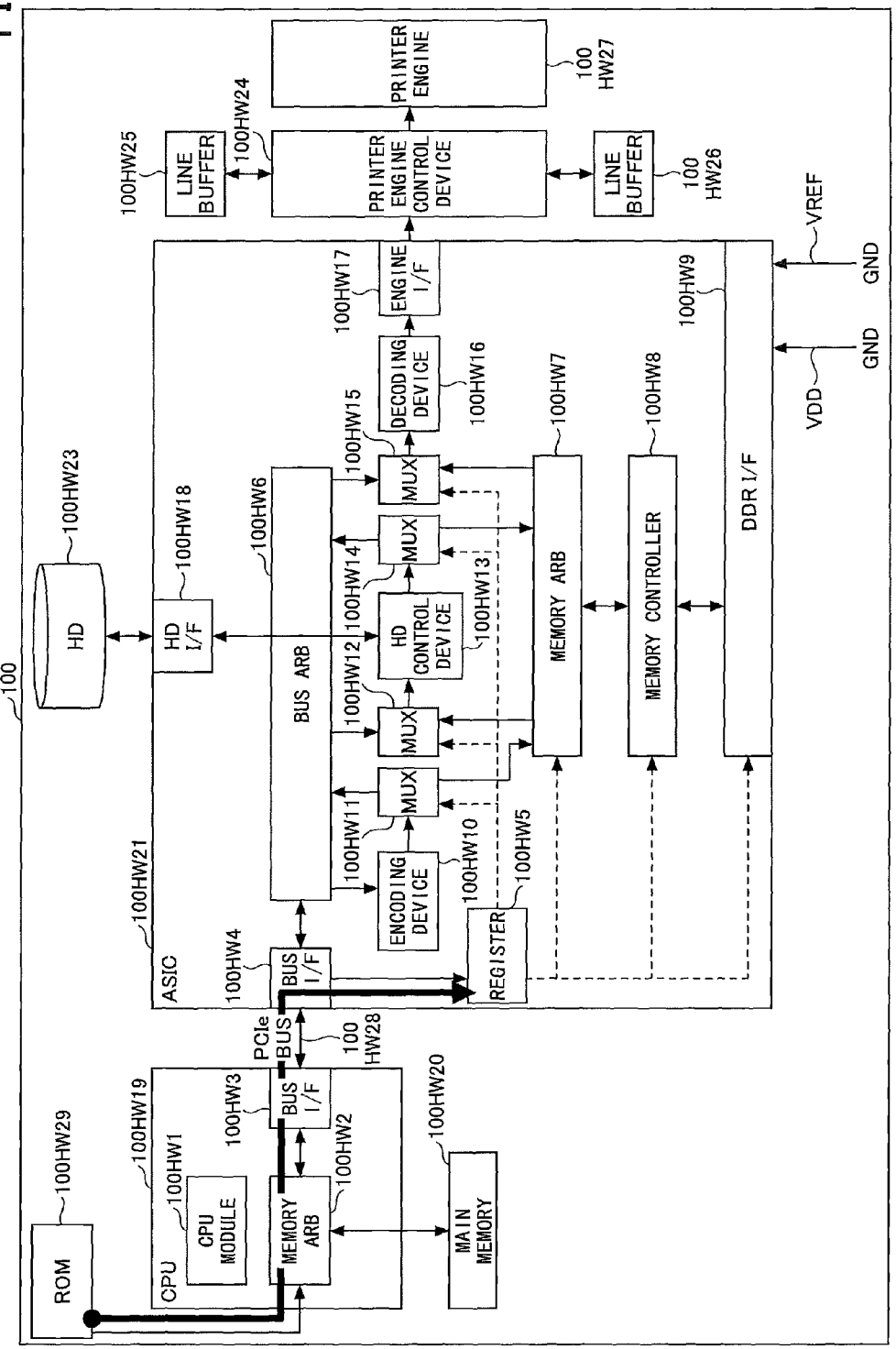
FIG. 13 is a block diagram illustrating an example of a flow of data in the mode setting by the second image forming apparatus according to an embodiment of the present invention.

FIG. 13 is a block diagram illustrating an example of a flow of data in the mode setting by the second image forming apparatus 102 according to an embodiment of the present invention. For example, the second image forming apparatus 102 performs mode setting by the same method as that of the image forming apparatus 100, that is, by the method of step S02 in FIG. 3. The configuration of the second image forming apparatus 102 is different from that of FIG. 2, and therefore, a different setting value, etc., from the setting value, etc., for the configuration of FIG. 2, is set in the register 100HW5. Therefore, the MUX 100HW11, the MUX 100HW12, the MUX 100HW14, and the MUX 100HW15 are set so as to send image data in different ways from those of the configuration of FIG. 2. Details of each MUX are described below. Furthermore, based on a setting value, etc., set in the register 100HW5, the settings of the memory ARB 100HW7, the memory controller 100HW8, and the DDR I/F 100HW9 are also different from those in the configuration of FIG. 2.

Next, the second image forming apparatus 102 generates the input image data DIN by the CPU module 100HW1, and stores the input image data DIN in the main memory 100HW20. For example, the second image forming apparatus 102 generates the input image data DIN by the method of step S401 of FIG. 4, etc., and stores the input image data DIN in the main memory 100HW20. Note that the flow of the data is, for example, as follows.

Figure 14:
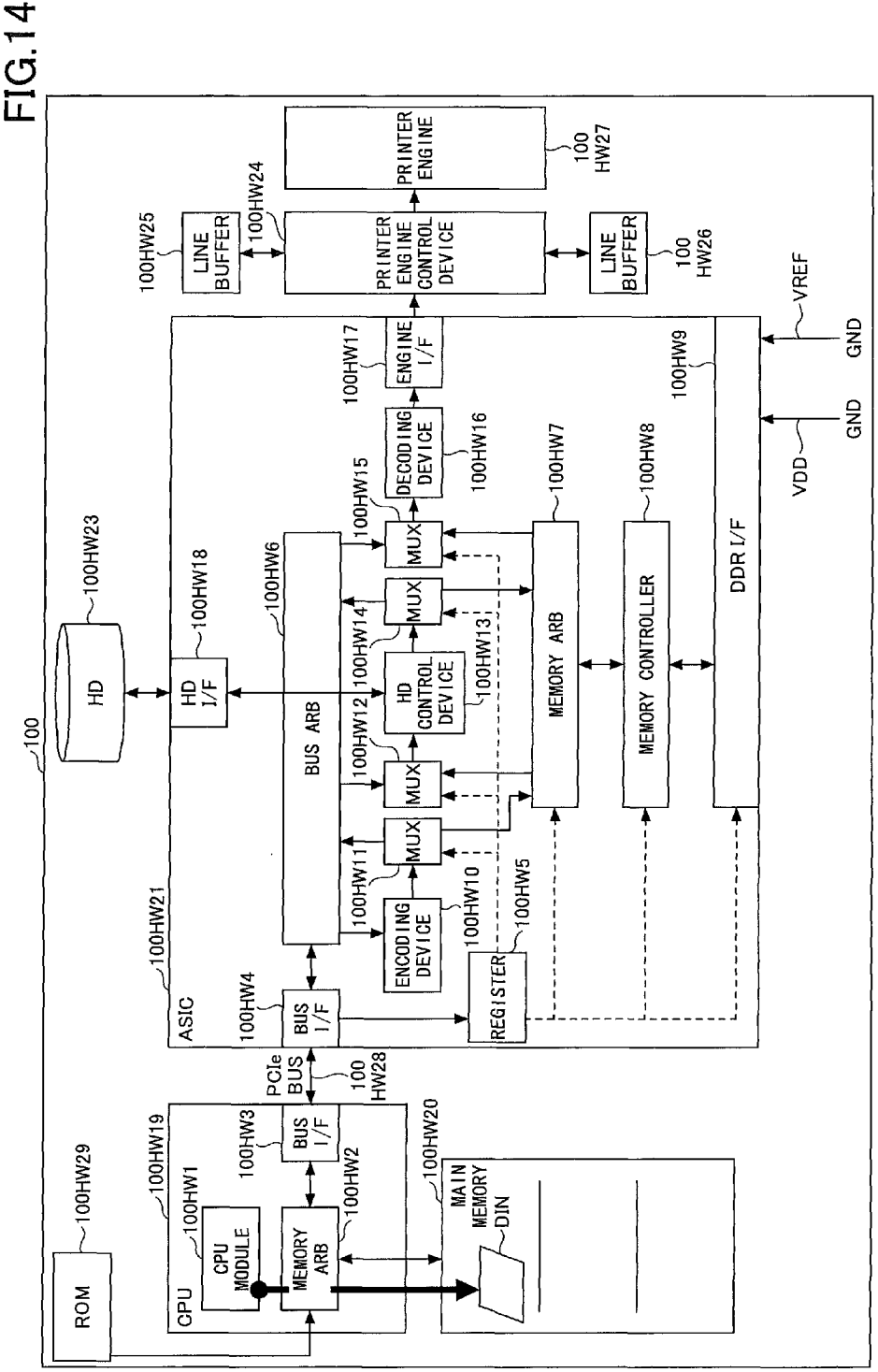
FIG. 14 is a block diagram illustrating an example of a flow of data in the generation of the input image data by the second image forming apparatus according to an embodiment of the present invention.

FIG. 14 is a block diagram illustrating an example of a flow of data in the generation of the input image data by the second image forming apparatus 102 according to an embodiment of the present invention. That is, the flow of the data is the same as the flow of data illustrated in FIG. 6.

Figure 15:
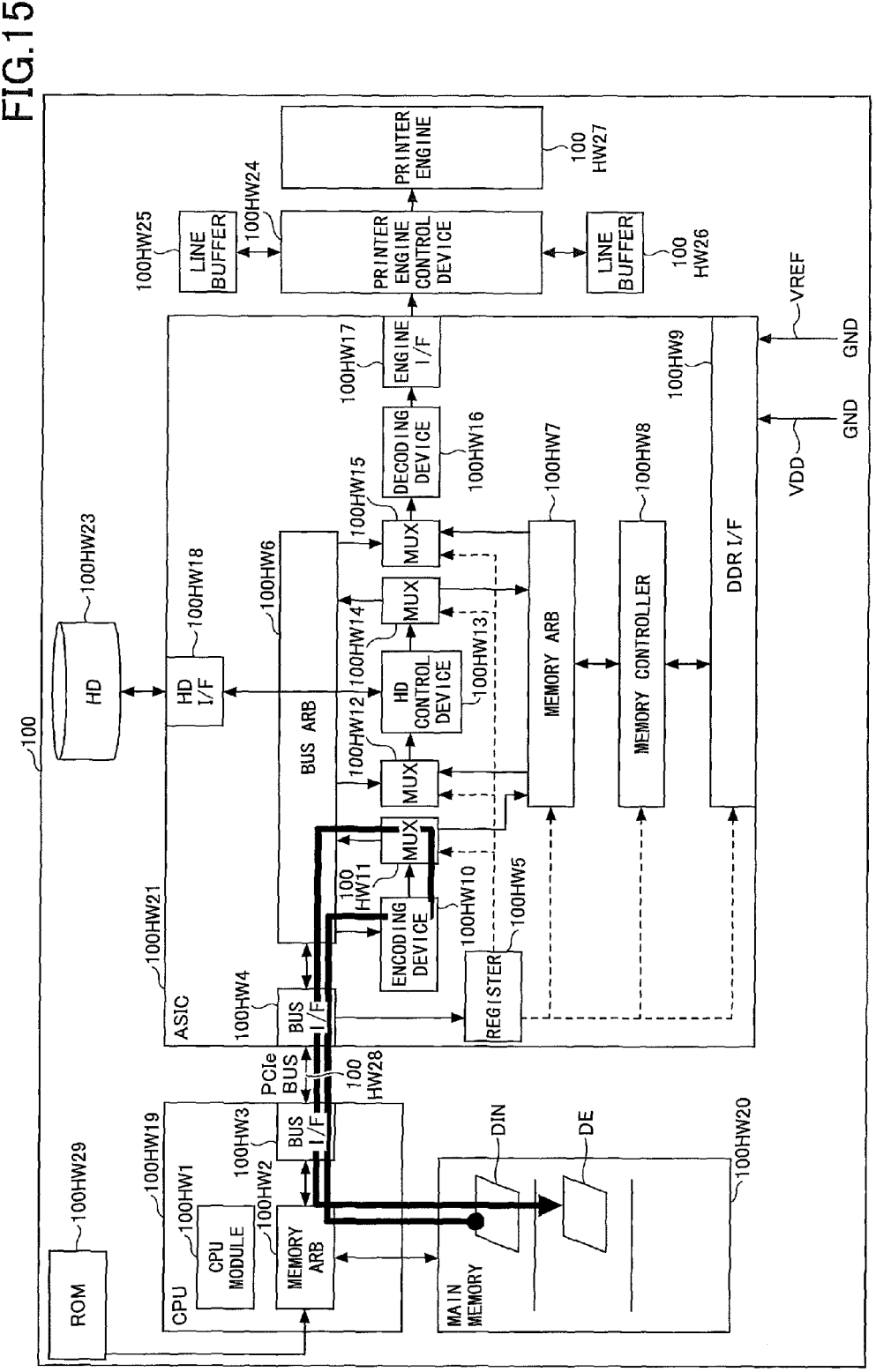
FIG. 15 is a block diagram illustrating an example of a flow of data in the encoding of image data by the second image forming apparatus according to an embodiment of the present invention.

FIG. 15 is a block diagram illustrating an example of a flow of data in the encoding of image data by the second image forming apparatus 102 according to an embodiment of the present invention. First, the second image forming apparatus 102 inputs the input image data DIN in the ASIC 100HW21, via the PCIe bus 100HW28. Next, the ASIC 100HW21 encodes the input image data DIN by the encoding device 100HW10, and generates the encoded image data DE. Then, the ASIC 100HW21 sends the encoded image data DE to the CPU 100HW19, via the PCIe bus 100HW28. Next, the encoded image data DE that has been sent is stored in the main memory 100HW20 by the CPU 100HW19.

Note that as illustrated in FIG. 15, based on a setting value set in the register 100HW5, the MUX 100HW11 is set so as to send the encoded image data DE to the bus ARB 100HW6, differently from FIG. 7.

Figure 16:
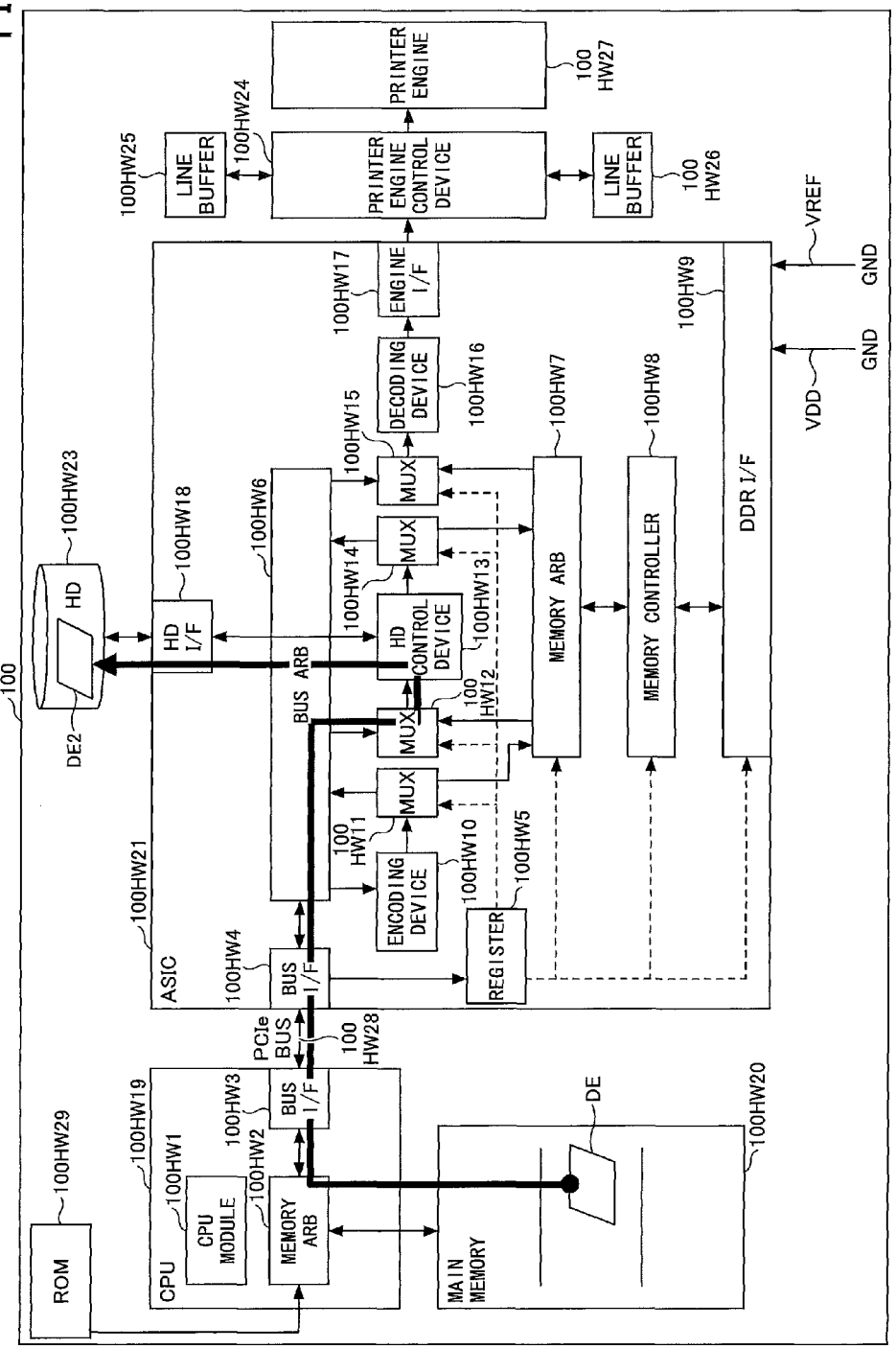
FIG. 16 is a block diagram illustrating an example of a flow of data in a process of storing the image data in a hard disk by the second image forming apparatus according to an embodiment of the present invention.

FIG. 16 is a block diagram illustrating an example of a flow of data in a process of storing the image data in a hard disk by the second image forming apparatus 102 according to an embodiment of the present invention. Specifically, first, the encoded image data DE stored in the main memory 100HW20 by the process of FIG. 15, is input to the ASIC 100HW21 via the PCIe bus 100HW28. Then, the HD control device 100HW13 stores the image data (hereinafter referred to as "second encoded image data DE2") in the HD 100HW23, based on the encoded image data DE.

Note that as illustrated in FIG. 16, based on a setting value set in the register 100HW5, the MUX 100HW12 is set so as to send the encoded image data DE, which is sent from the bus ARB 100HW6, to the HD control device 100HW13, differently from FIG. 8.

Figure 17:
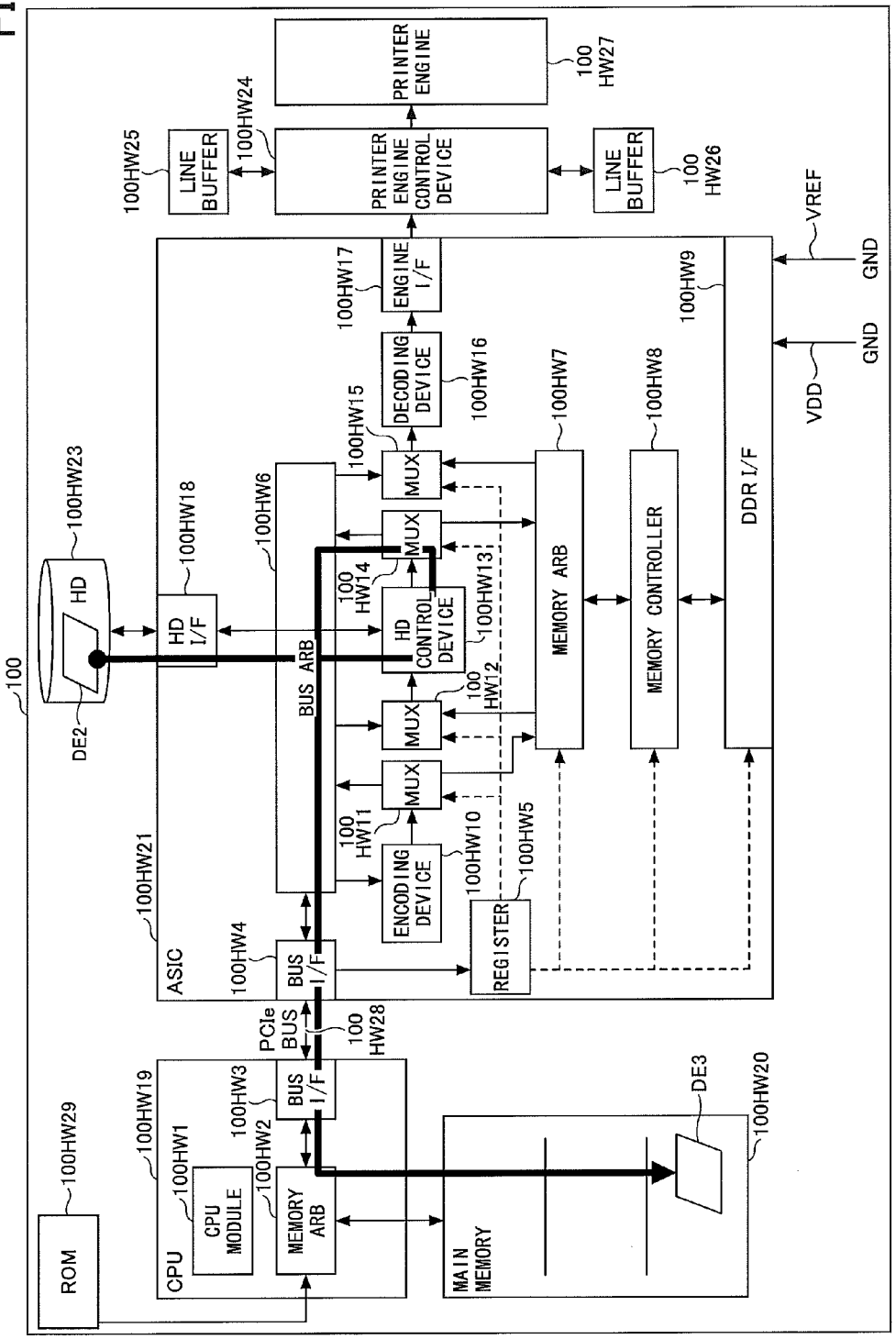
FIG. 17 is a block diagram illustrating an example of a flow of data in a process of reading image data from the hard disk by the second image forming apparatus according to an embodiment of the present invention.

FIG. 17 is a block diagram illustrating an example of a flow of data in a process of reading image data from the hard disk by the second image forming apparatus 102 according to an embodiment of the present invention. First, the second encoded image data DE2, which is stored in the HD 100HW23 by the process of FIG. 16, is read by the HD control device 100HW13. Next, the ASIC 100HW21 sends the second encoded image data DE2 to the CPU 100HW19, via the PCIe bus 100HW28. Next, the second encoded image data DE2 that has been sent is stored in the main memory 100HW20 by the CPU 100HW19. Note that in the following description, the encoded image data stored in the main memory 100HW20 is referred to as "third encoded image data DE3".

Furthermore, as illustrated in FIG. 17, based on a setting value set in the register 100HW5, the MUX 100HW14 is set so as to send the second encoded image data DE2 to the bus ARB 100HW6, differently from FIG. 9.

Figure 18:
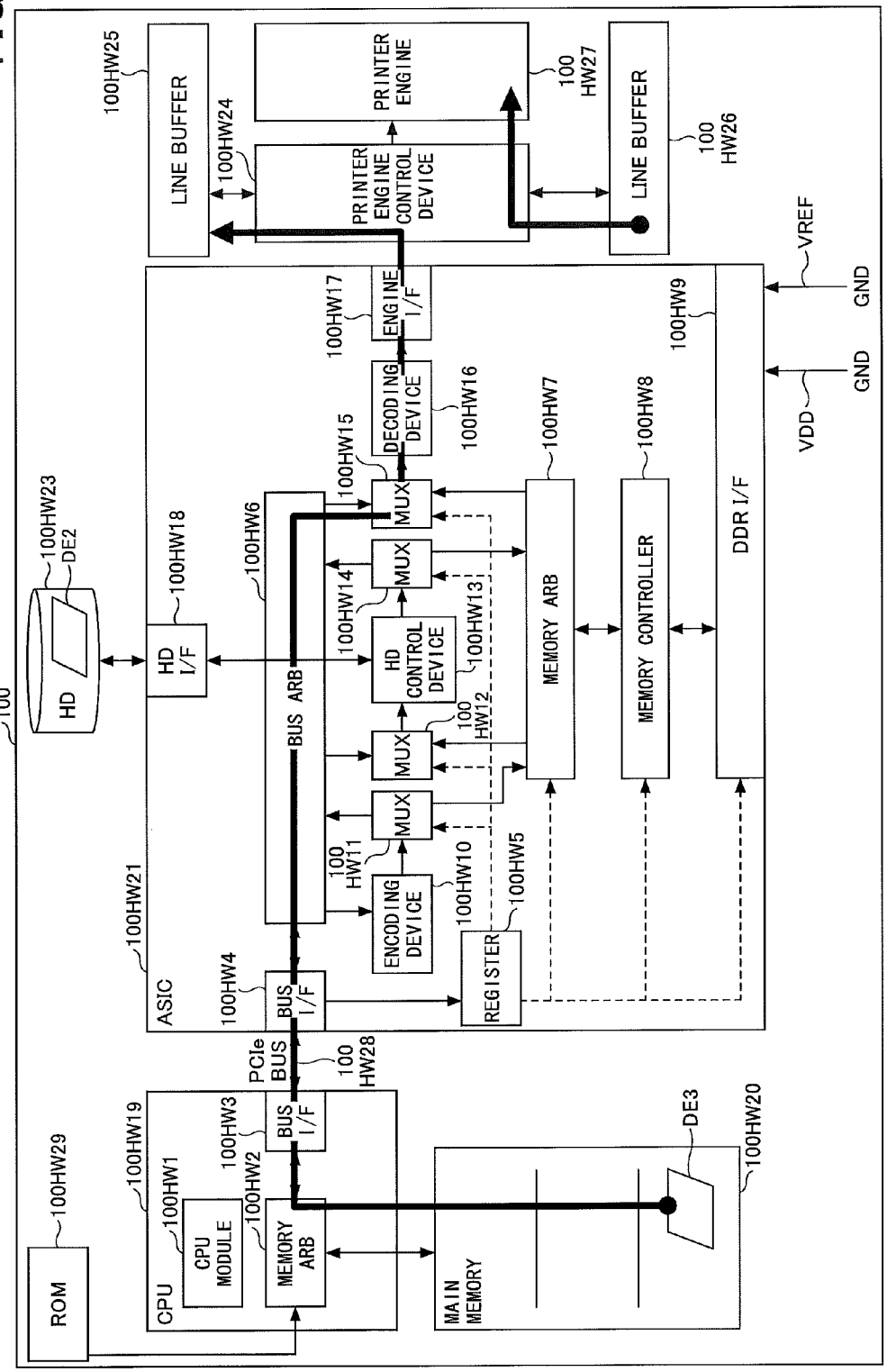
FIG. 18 is a block diagram illustrating an example of a flow of data in outputting image data by the second image forming apparatus according to an embodiment of the present invention.

FIG. 18 is a block diagram illustrating an example of a flow of data in outputting image data by the second image forming apparatus 102 according to an embodiment of the present invention. First, as illustrated in FIG. 18, the third encoded image data DE3, which is stored in the main memory 100HW20 by the process of FIG. 17, is input to the ASIC 100HW21 via the PCIe bus 100HW28. Then, the third encoded image data DE3 is decoded by the decoding device 100HW16, and output image data is generated. Next, the ASIC 100HW21 outputs the output image data to the printer engine 100HW27. Note that the method of outputting the output image data to the printer engine 100HW27 is, for example, the same as the method illustrated in FIG. 10.

Furthermore, as illustrated in FIG. 18, based on a setting value set in the register 100HW5, the MUX 100HW15 is set so as to send the third encoded image data DE3, which is sent from the bus ARB 100HW6, to the decoding device 100HW16, differently from FIG. 10.

Furthermore, in the configuration of FIG. 12, a power supply voltage terminal VDD and a reference voltage terminal VREF of the DDR I/F 100HW9 are preferably coupled to ground GND, as illustrated in FIG. 12. Furthermore, in the configuration of FIG. 12, a power supply voltage terminal VCC of the memory controller 100HW8 is preferably coupled to ground GND. On the other hand, in the configuration of FIG. 12, the power supply voltage terminal VDD and the reference voltage terminal VREF of the DDR I/F 100HW9, and the power supply voltage terminal VCC of the memory controller 100HW8 have the following configuration.

Figure 19:
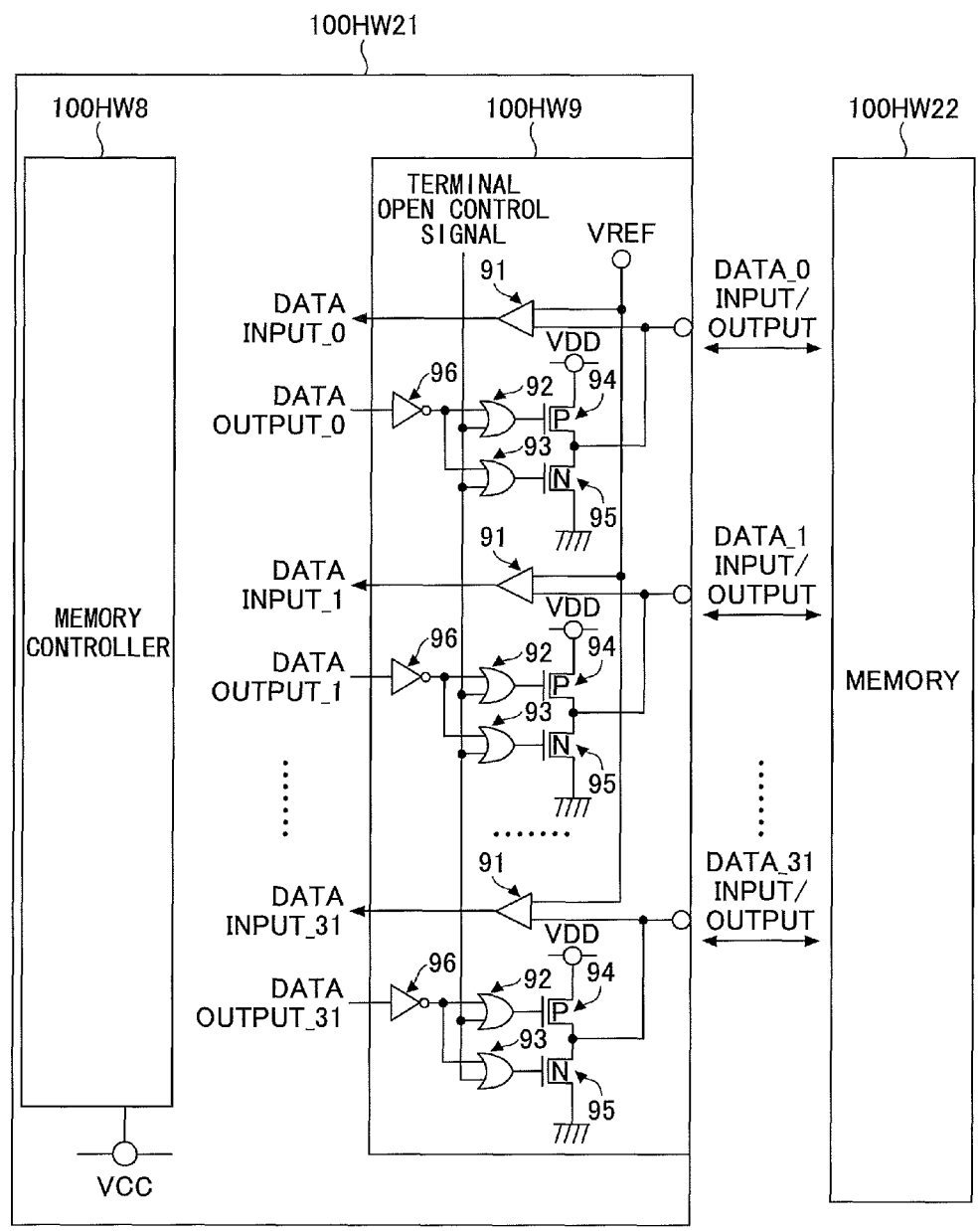
FIG. 19 is a circuit diagram illustrating an example of a circuit configuration of a DDR I/F according to an embodiment of the present invention.

FIG. 19 is a circuit diagram illustrating an example of a circuit configuration of the DDR I/F 100HW9 according to an embodiment of the present invention. The example illustrated in FIG. 19 is a data input output circuit of 32 bits. For example, in the configuration of FIG. 2, the DDR I/F 100HW9 has a circuit as illustrated in FIG. 19. As illustrated in FIG. 19, in the configuration of FIG. 2, that is, in a configuration including the memory 100HW22, the power supply voltage terminal VDD and the reference voltage terminal VREF of the DDR I/F 100HW9, and the power supply voltage terminal VCC of the memory controller 100HW8 are respectively coupled to power sources, etc., so as to receive a predetermined voltage.

Furthermore, in the example illustrated in FIG. 19, a terminal open control signal is switched between "H" (High) and "L" (Low) based on a setting value, etc., set in the register 100HW5 (FIG. 2). For example, in the configuration of FIG. 2, the terminal open control signal is "L". On the other hand, in the configuration of FIG. 12, the terminal open control signal is "H". In a configuration that does not include the memory 100HW22, as illustrated in FIG. 12, with respect to the terminal of the DDR I/F 100HW9 that is open, the mode becomes the output mode, and therefore "L" is output. Therefore, in the configuration of FIG. 12, "L" is input to an input buffer 91.

The input buffer 91 receives an output signal from the memory 100HW22, based on a standard relevant to DDR, such as High Speed Transceiver Logic (HSTL) and Stub Series Termination Logic (SSTL). Then, the input buffer 91 determines whether the voltage of the reference voltage terminal VREF is "H" or "L", and outputs a determination result. Note that the voltage of the reference voltage terminal VREF is, for example, approximately half the power supply voltage of the memory 100HW22.

A first OR circuit 92 controls a gate 94 of a Pch transistor at the output. Specifically, when the terminal open control signal is "H", the first OR circuit 92 outputs "H". Then, when "H" is output from the first OR circuit 92, the gate 94 of the Pch transistor at the output is controlled to be opened.

A second OR circuit 93 controls a gate 95 of an Nch transistor at the output. Specifically, when the terminal open control signal is "H", the second OR circuit 93 outputs "H". Then, when "H" is output from the second OR circuit 93, the gate 95 of the Nch transistor at the output is closed, and is controlled to output "L".

When the gate 94 of the Pch transistor at the output is "L", the Pch transistor at the output outputs "H". Then, by the output of "H", the Pch transistor at the output outputs a voltage of the power supply voltage terminal VDD.

When the gate 95 of the Nch transistor at the output is "H", the Nch transistor at the output outputs "L".

An inverter 96 is a circuit for inverting the data output signal.

In the 32 bit configuration, there are a total of 32 sets of the input buffer 91 through the inverter 96, similar to the above.

On the other hand, in the configuration of FIG. 12 that does not include the memory 100HW22, the power supply voltage terminal VDD and the reference voltage terminal VREF of the DDR I/F 100HW9, and the power supply voltage terminal VCC of the memory controller 100HW8 are preferably respectively coupled to ground GND.

When the power supply voltage terminal VDD, the reference voltage terminal VREF, and the power supply voltage terminal VCC of the memory controller 100HW8 are respectively coupled to ground GND, the second image forming apparatus 102 is able to reduce the through-current.

Furthermore, the second image forming apparatus 102 may have a configuration in which "H" is input to the gate 94 of the Pch transistor, "L" is input to the gate 95 of the Nch transistor, and furthermore, input output terminals indicated by "data_0 input/output", etc., are coupled to ground GND or the power supply voltage terminal VDD. Also in this kind of configuration, the second image forming apparatus 102 is able to reduce the through-current.

<Functional Configuration>

Figure 20:
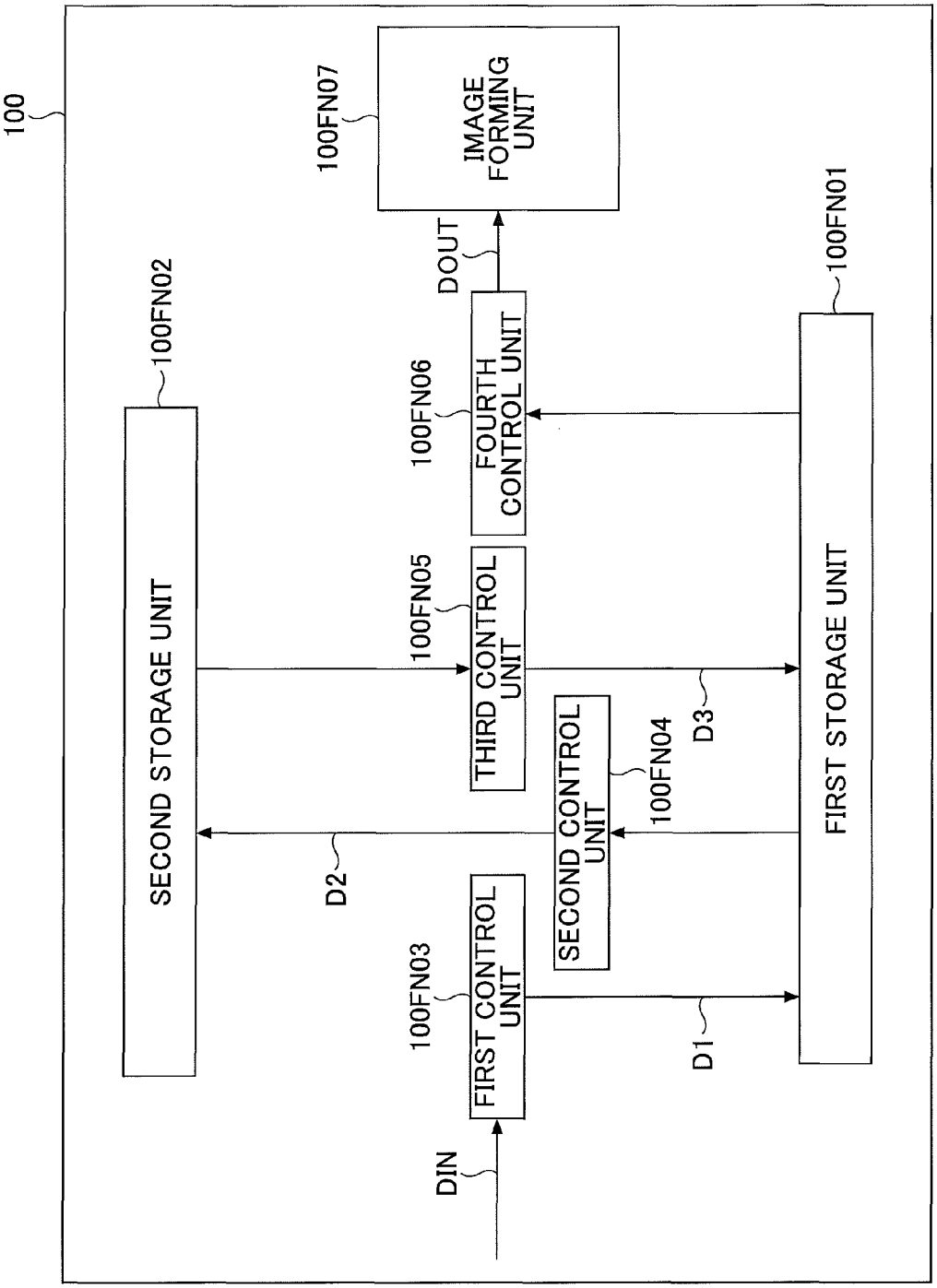
FIG. 20 is a functional block diagram of an example of a functional configuration of the image forming apparatus according to an embodiment of the present invention.

FIG. 20 is a functional block diagram of an example of a functional configuration of the image forming apparatus 100 according to an embodiment of the present invention. Specifically, the image forming apparatus 100 includes a first storage unit 100FN01 and a second storage unit 100FN02. Furthermore, the image forming apparatus 100 includes a first control unit 100FN03, a second control unit 100FN04, a third control unit 100FN05, a fourth control unit 100FN06, and an image forming unit 100FN07.

When the input image data DIN is input via a bus, the first control unit 100FN03 stores the first image data D1 based on the input image data DIN, in the first storage unit 100FN01. For example, the first control unit 100FN03 is realized by the MUX 100HW11 (FIG. 2), the memory ARB 100HW7 (FIG. 2), the memory controller 100HW8 (FIG. 2), and the DDR I/F 100HW9 (FIG. 2), etc.

The second control unit 100FN04 stores the second image data D2 based on the first image data D1, in the second storage unit 100FN02. For example, the second control unit 100FN04 is realized by the HD control device 100HW13 (FIG. 2), the MUX 100HW12 (FIG. 2), the memory ARB 100HW7 (FIG. 2), the memory controller 100HW8 (FIG. 2), and the DDR I/F 100HW9 (FIG. 2), etc.

The third control unit 100FN05 stores the third image data D3 based on the second storage area M2, in the first storage unit 100FN01. For example, the third control unit 100FN05 is realized by the HD control device 100HW13 (FIG. 2), the MUX 100HW14 (FIG. 2), the memory ARB 100HW7 (FIG. 2), the memory controller 100HW8 (FIG. 2), and the DDR I/F 100HW9 (FIG. 2), etc.

The fourth control unit 100FN06 outputs the output image data DOUT based on the third image data D3. For example, the fourth control unit 100FN06 is realized by the MUX 100HW15 (FIG. 2), the memory ARB 100HW7 (FIG. 2), the memory controller 100HW8 (FIG. 2), and the DDR I/F 100HW9 (FIG. 2), etc.

The image forming unit 100FN07 performs image forming based on the output image data DOUT. For example, the image forming unit 100FN07 is realized by the printer engine control device 100HW24 (FIG. 2) and the printer engine 100HW27 (FIG. 2).

Furthermore, in the above example, the configuration is divided according to the main functions to facilitate the understanding of processes. Thus, an embodiment of the present invention is not limited by how the process units are divided or the names of the process units. For example, the processes may be further divided into many process units according to the process contents. Furthermore, the process units may be divided such that a single process unit further includes many processes.

Furthermore, the image forming apparatus is not limited to being realized by a single apparatus. That is, an embodiment of the present invention may be realized by an image forming system including one or more information processing apparatuses. Note that the image forming apparatus or the image forming system may perform all of or part of the processes in a distributed manner, in a redundant manner, in a parallel manner, or by a combination of these manners.

According to one embodiment of the present invention, an image forming apparatus, which is capable of reducing the competition for using a bus in image forming operations, is provided.

The an image forming apparatus and the image forming method are not limited to the specific embodiments described in the detailed description, and variations and modifications may be made without departing from the spirit and scope of the present invention.

What is claimed is:

1. An image forming apparatus including a first storage, a second storage, and a bus, the image forming apparatus comprising:
    a first controller configured to store first image data based on input image data, in the first storage, when the input image data is input via the bus;
    a second controller configured to store second image data based on the first image data, in the second storage;
    a third controller configured to store third image data based on the second image data, in the first storage;
    a fourth controller configured to output image data based on the third image data; and
    an image former configured to perform image formation based on the output image data,
    wherein the first controller, the second controller, the third controller, and the fourth controller are included in a first device provided in the image forming apparatus,
    a second device, which is provided in the image forming apparatus and different from the first device, is coupled to the bus, and
    the second device is configured to perform image processing to generate the input image data, and send the input image data to the first device via the bus.

2. The image forming apparatus according to claim 1, further comprising:
    an encoder configured to generate the first image data by encoding the input image data; and
    a decoder configured to generate the output image data by decoding the third image data.

3. The image forming apparatus according to claim 2, wherein the encoder encodes the input image data by arithmetic encoding, predictive encoding, dictionary encoding, or run-length encoding.

4. The image forming apparatus according to claim 1, wherein
    the first storage includes
        a first storage area configured to store the first image data, and
        a second storage area configured to store the third image data.

5. The image forming apparatus according to claim 1, wherein the fourth controller outputs the output image data to the image former at a predetermined data transfer speed.

6. The image forming apparatus according to claim 1, wherein
    the second device includes a third storage configured to store the input image data, and
    the second device sends the input image data stored in the third storage, to the first device.

7. The image forming apparatus according to claim 1, wherein the bus is used to send data to be used by a device that is different from the first device.

8. The image forming apparatus according to claim 1, wherein the first device is also used for an image forming apparatus including the image former, the second storage, and the bus.

9. The image forming apparatus according to claim 8, wherein
    the first device includes an interface for sending and receiving image data with the first storage, and
    the interface includes a power supply voltage terminal and a reference voltage terminal that are coupled to ground.

10. The image forming apparatus according to claim 8, wherein
    the first device includes a memory controller configured to control the first controller, and the memory controller includes a power supply voltage terminal that is coupled to ground.

11. The image forming apparatus according to claim 8, wherein the first device makes a setting as to whether the image forming apparatus has a configuration in which the first storage is connected, when the image forming apparatus is activated.

12. The image forming apparatus according to claim 1, wherein
the second storage is formed of a hard disk, and
the second storage is coupled to the first device.

13. The image forming apparatus according to claim 1, wherein
the first storage is formed of a Double-Data-Rate Synchronous Dynamic Access Memory (DDR), and
the first storage is coupled to the first device.

14. An image forming method performed by an image forming apparatus including a first storage, a second storage, and a bus, the image forming method comprising:
storing first image data based on input image data, in the first storage, when the input image data is input via the bus;
storing second image data based on the first image data, in the second storage;
storing third image data based on the second image data, in the first storage;
outputting image data based on the third image data; and
performing image formation based on the output image data,
wherein the storing the first image data, the second image data and the third image data and the outputting the output image data are performed by a first device provided in the image forming apparatus,
a second device, which is provided in the image forming apparatus and different from the first device, is coupled to the bus, and
the method further comprises performing, by the second device, image processing to generate the input image data, and sending the input image data to the first device via the bus.

15. A non-transitory computer-readable recording medium storing a program that causes a computer to execute a process performed in an image forming apparatus including a first storage, a second storage, and a bus, the process comprising:
storing first image data based on input image data, in the first storage, when the input image data is input via the bus;
storing second image data based on the first image data, in the second storage;
storing third image data based on the second image data, in the first storage;
outputting image data based on the third image data; and
performing image formation based on the output image data,
wherein the storing the first image data, the second image data and the third image data and the outputting the output image data are performed by a first device provided in the image forming apparatus,
a second device, which is provided in the image forming apparatus and different from the first device, is coupled to the bus, and
the process further comprises performing, by the second device, image processing to generate the input image data, and sending the input image data to the first device via the bus.

* * * * *